United States Patent
Eguchi et al.

(10) Patent No.: US 7,539,344 B2
(45) Date of Patent: May 26, 2009

(54) BOUNDARY DETECTION METHOD BETWEEN AREAS HAVING DIFFERENT FEATURES IN IMAGE DATA

(75) Inventors: Shinichi Eguchi, Inagi (JP); Naoko Suzuki, Inagi (JP); Yutaka Katsumata, Inagi (JP); Kouichi Kanamoto, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1188 days.

(21) Appl. No.: 10/728,906

(22) Filed: Dec. 8, 2003

(65) Prior Publication Data
US 2004/0170324 A1   Sep. 2, 2004

(30) Foreign Application Priority Data
Dec. 20, 2002  (JP) .............................. 2002-370596

(51) Int. Cl.
G06K 9/48    (2006.01)
G06K 9/36    (2006.01)
(52) U.S. Cl. ...................................... 382/199; 382/280
(58) Field of Classification Search ................. 382/199, 382/280
See application file for complete search history.

(56) References Cited

U.S. PATENT DOCUMENTS

| | | | |
|---|---|---|---|
| 5,173,788 A * | 12/1992 | Ohta | 382/264 |
| 5,331,442 A * | 7/1994 | Sorimachi | 358/532 |
| 5,577,131 A | 11/1996 | Oddou | |
| 5,764,380 A * | 6/1998 | Noguchi | 358/488 |
| 5,767,978 A | 6/1998 | Revankar et al. | |
| 5,768,403 A | 6/1998 | Suzuki et al. | |
| 5,889,559 A * | 3/1999 | Yang | 375/240.11 |
| 5,982,952 A * | 11/1999 | Nakashima | 382/289 |

FOREIGN PATENT DOCUMENTS

| | | |
|---|---|---|
| JP | 03-170924 | 7/1991 |
| JP | 05-012439 | 1/1993 |

(Continued)

OTHER PUBLICATIONS

Japanese Office Action mailed Sep. 11, 2007 with English translation (4 pages).

(Continued)

*Primary Examiner*—John B Strege
(74) *Attorney, Agent, or Firm*—Kratz, Quintos & Hanson, LLP

(57) ABSTRACT

An image processing device includes a feature emphasis unit for extracting first image frequency information from image data for each first unit area, a boundary provisional determination unit for defining a value obtained by adding a predetermined weight to the first image frequency information as representative feature information, and provisionally determining as a boundary a first unit area whose variance from the representative feature information of the adjacent area is at or higher than a predetermined level, and a boundary determination unit for extracting the second image frequency information for each second unit area smaller than the first unit area in the range of a provisionally determined position and the vicinity, and generating boundary information using as the boundary a second unit area whose value based on the variance from the second image frequency information of the adjacent area is at or higher than a predetermined level.

47 Claims, 27 Drawing Sheets

FOREIGN PATENT DOCUMENTS

| | | |
|---|---|---|
| JP | 5-110779 | 4/1993 |
| JP | 06-037987 | 2/1994 |
| JP | 07-099581 | 4/1995 |
| JP | 7-115514 | 5/1995 |
| JP | 07-115514 | 5/1995 |
| JP | 10-23191 | 1/1998 |
| WO | WO 94 03871 | 2/1994 |
| WO | WO 94 03871 A | 2/1994 |

OTHER PUBLICATIONS

European Office Action in co-pending EPC patent application.
Office Action issued in co-pending Chinese patent application (2003 310123961.3).

\* cited by examiner

| X COORDINATE | DIRECT CURRENT ELEMENT R | DIRECT CURRENT ELEMENT G | DIRECT CURRENT ELEMENT B | LOW FREQUENCY ELEMENT R | LOW FREQUENCY ELEMENT G | LOW FREQUENCY ELEMENT B | HIGH FREQUENCY ELEMENT R | HIGH FREQUENCY ELEMENT G | HIGH FREQUENCY ELEMENT B |
|---|---|---|---|---|---|---|---|---|---|
| 0 | 251 | 255 | 255 | 0.35 | 0.13 | 0.00 | 0.312482 | 0.105303 | 0.000000 |
| 4 | 251 | 254 | 255 | 0.35 | 0.16 | 0.02 | 0.317167 | 0.163026 | 0.018861 |
| 8 | 252 | 254 | 255 | 0.35 | 0.18 | 0.05 | 0.305198 | 0.157446 | 0.054425 |
| 12 | 252 | 254 | 255 | 0.32 | 0.15 | 0.00 | 0.291552 | 0.131851 | 0.000000 |
| 16 | 252 | 255 | 255 | 0.34 | 0.13 | 0.03 | 0.269472 | 0.140766 | 0.031250 |
| 20 | 252 | 255 | 255 | 0.30 | 0.12 | 0.02 | 0.316194 | 0.113653 | 0.019831 |
| 24 | 252 | 254 | 255 | 0.40 | 0.17 | 0.00 | 0.326063 | 0.162740 | 0.000000 |
| 28 | 251 | 255 | 255 | 0.31 | 0.11 | 0.02 | 0.323525 | 0.083686 | 0.018861 |
| 32 | 252 | 255 | 255 | 0.38 | 0.11 | 0.00 | 0.328309 | 0.095564 | 0.000000 |
| 36 | 251 | 255 | 255 | 0.33 | 0.10 | 0.03 | 0.335016 | 0.091632 | 0.039275 |
| 40 | 252 | 255 | 255 | 0.30 | 0.17 | 0.00 | 0.313465 | 0.165461 | 0.000000 |
| 44 | 252 | 254 | 255 | 0.33 | 0.11 | 0.04 | 0.281654 | 0.093890 | 0.000000 |
| 48 | 252 | 254 | 255 | 0.33 | 0.14 | 0.00 | 0.231198 | 0.121620 | 0.020326 |
| 52 | 252 | 255 | 255 | 0.33 | 0.11 | 0.02 | 0.282260 | 0.127697 | 0.000000 |
| 56 | 251 | 254 | 255 | 0.36 | 0.18 | 0.00 | 0.267413 | 0.145008 | 0.000000 |
| 60 | 252 | 255 | 255 | 0.31 | 0.14 | 0.02 | 0.329278 | 0.112263 | 0.018143 |
| 64 | 253 | 254 | 255 | 0.26 | 0.15 | 0.00 | 0.247658 | 0.131220 | 0.000000 |
| 68 | 252 | 254 | 255 | 0.34 | 0.13 | 0.02 | 0.307986 | 0.119091 | 0.000000 |
| 72 | 251 | 255 | 255 | 0.35 | 0.15 | 0.00 | 0.322422 | 0.106955 | 0.000000 |
| 76 | 252 | 255 | 255 | 0.29 | 0.17 | 0.03 | 0.247658 | 0.136985 | 0.000000 |
| 80 | 252 | 254 | 255 | 0.29 | 0.11 | 0.00 | 0.282899 | 0.104349 | 0.000000 |
| 84 | 252 | 255 | 255 | 0.32 | 0.11 | 0.00 | 0.278326 | 0.099585 | 0.000000 |
| 88 | 252 | 255 | 255 | 0.25 | 0.09 | 0.00 | 0.295241 | 0.087684 | 0.000000 |
| 92 | 253 | 255 | 255 | 0.31 | 0.11 | 0.00 | 0.251675 | 0.087597 | 0.000000 |
| 96 | 253 | 255 | 255 | 0.23 | 0.10 | 0.02 | 0.270370 | 0.087871 | 0.000000 |
| 100 | 253 | 254 | 255 | 0.25 | 0.15 | 0.00 | 0.233297 | 0.143751 | 0.018073 |
| 104 | 253 | 255 | 255 | 0.29 | 0.10 | 0.02 | 0.222948 | 0.086416 | 0.000000 |
| 108 | 253 | 255 | 255 | 0.21 | 0.11 | 0.03 | 0.234780 | 0.100877 | 0.000000 |
| 112 | 254 | 254 | 255 | 0.20 | 0.08 | 0.00 | 0.157112 | 0.057389 | 0.312500 |
| 116 | 254 | 255 | 255 | 0.22 | 0.05 | 0.00 | 0.146726 | 0.019831 | 0.000000 |
| 120 | 254 | 255 | 255 | 0.19 | 0.07 | 0.03 | 0.193532 | 0.075189 | 0.000000 |
| 124 | 254 | 254 | 255 | 0.30 | 0.08 | 0.03 | 0.176843 | 0.080868 | 0.000000 |
| 128 | 252 | 254 | 255 | 0.28 | 0.13 | 0.03 | 0.254739 | 0.124054 | 0.108177 |
| 132 | 253 | 254 | 255 | 0.28 | 0.23 | 0.11 | 0.232993 | 0.178666 | 0.108077 |
| 136 | 255 | 255 | 255 | 0.00 | 0.00 | 0.00 | 0.000000 | 0.000000 | 0.000000 |
| 140 | 255 | 255 | 255 | 0.02 | 0.00 | 0.00 | 0.000000 | 0.000000 | 0.000000 |
| 144 | 255 | 255 | 255 | 0.00 | 0.00 | 0.00 | 0.000000 | 0.000000 | 0.000000 |
| 148 | 255 | 255 | 255 | 0.00 | 0.00 | 0.00 | 0.000000 | 0.000000 | 0.000000 |
| 152 | 255 | 255 | 255 | 0.00 | 0.00 | 0.00 | 0.000000 | 0.000000 | 0.000000 |
| 156 | 255 | 255 | 255 | 0.00 | 0.00 | 0.00 | 0.000000 | 0.000000 | 0.000000 |
| 160 | 255 | 255 | 255 | 0.00 | 0.00 | 0.00 | 0.000000 | 0.000000 | 0.000000 |
| 164 | 255 | 254 | 255 | 0.00 | 0.00 | 0.00 | 0.000000 | 0.000000 | 0.000000 |
| 168 | 255 | 255 | 255 | 0.00 | 0.00 | 0.00 | 0.000000 | 0.000000 | 0.000000 |

FIG. 7

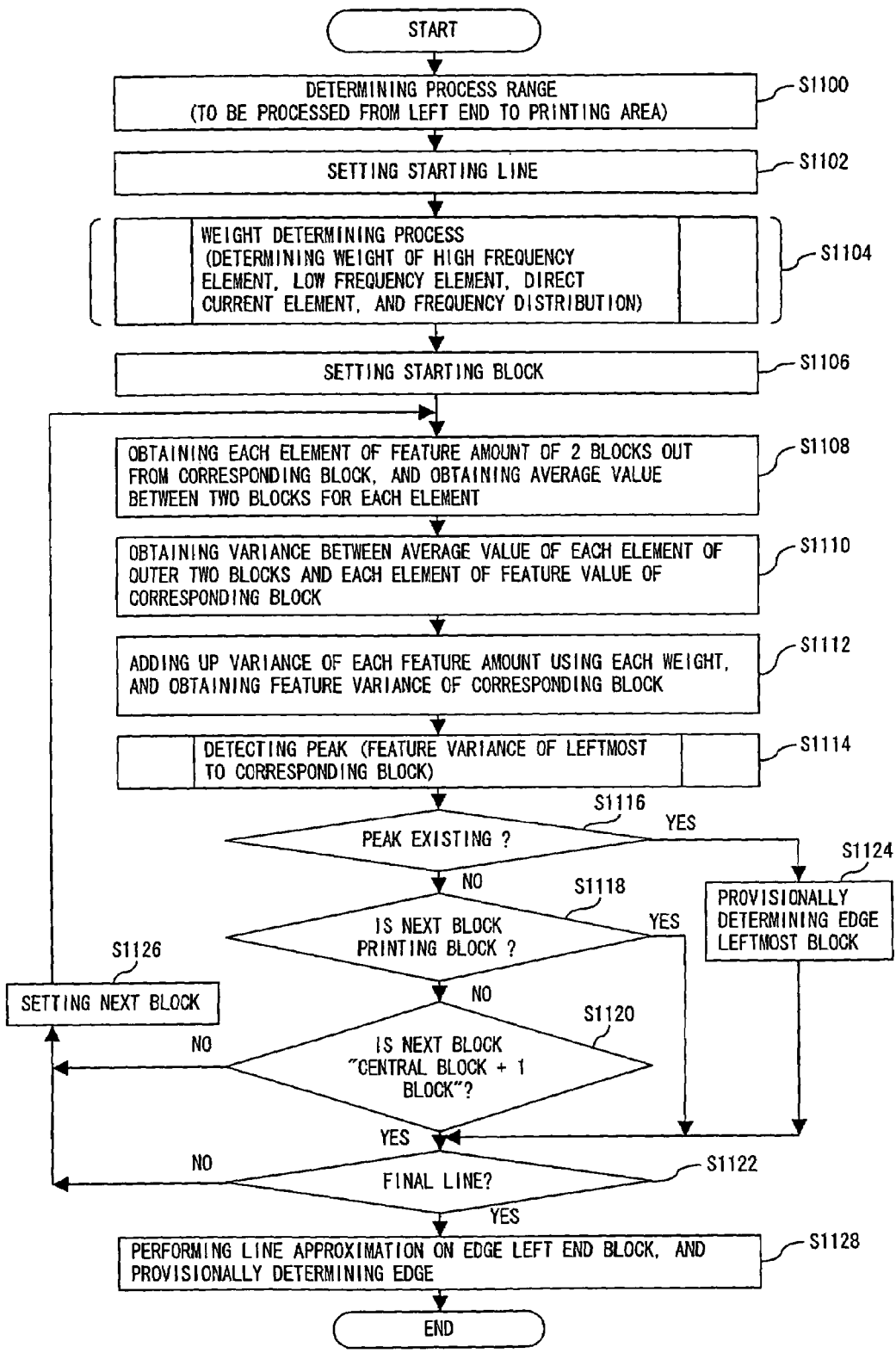
F I G. 1 1

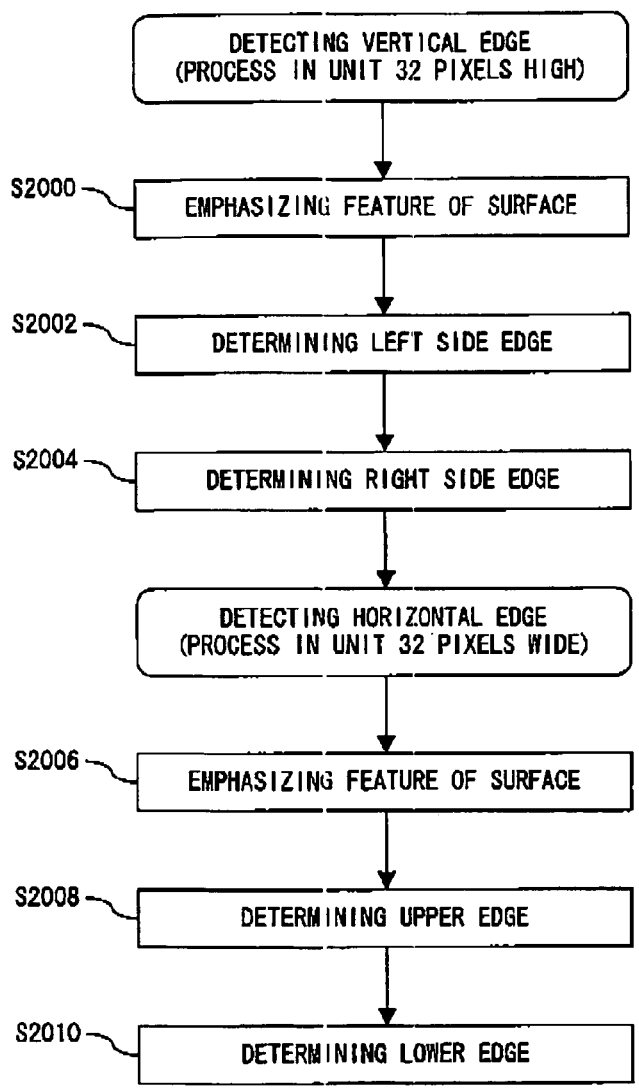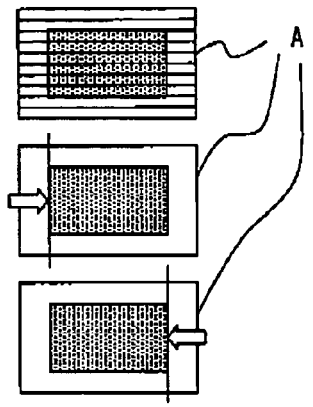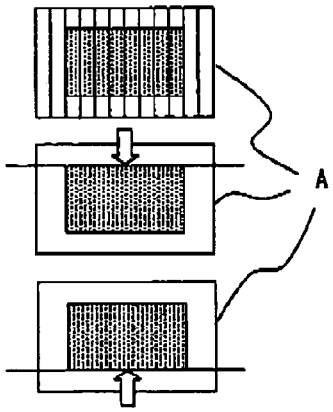
FIG. 20

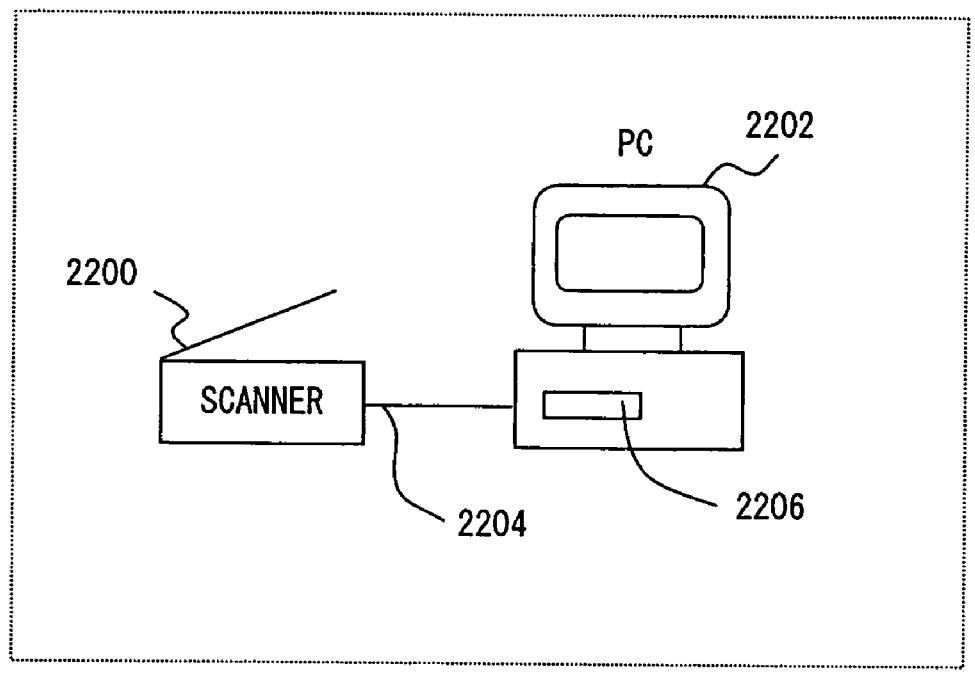
F I G. 2 2

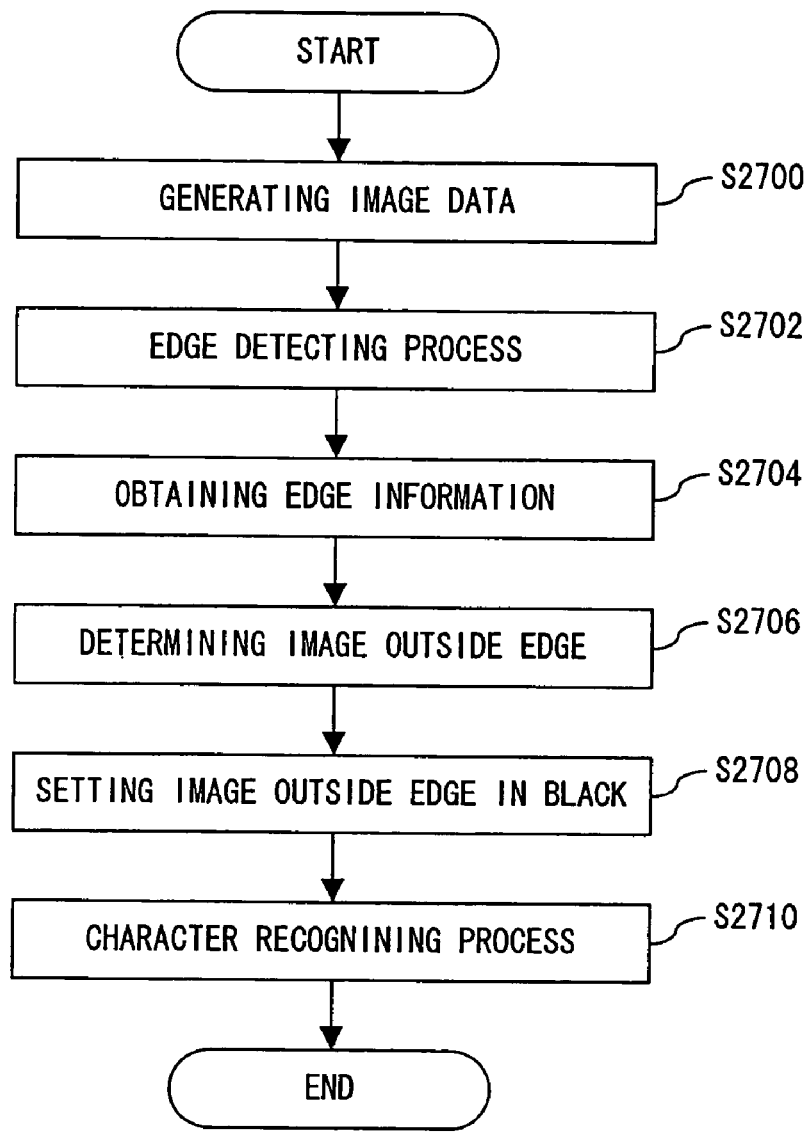
F I G. 2 7

BOUNDARY DETECTION METHOD BETWEEN AREAS HAVING DIFFERENT FEATURES IN IMAGE DATA

BACKGROUND OF THE INVENTION

1. Field of the Invention

The present invention relates to an image processing technology, and more specifically to an image processing technology of detecting the position in which the feature of an area changes in image data.

2. Description of the Related Art

An image reader for optically reading data such as a scanner, a copying machine, etc. is well known as a device capable of converting an original (for example, a paper medium, etc.) into data by reading optically the original. A read of the original in the image reader is normally performed by setting the face of the original (surface to be read data from) facing the reading surface of the image reader, and by covering the back of the original with an original cover for covering the original. When an image is practically read from the original, light is emitted from the reading surface to the face of the original set as facing the reading surface as described above, the light reflected from the face of the original is read line by line by an optical reader device (for example, a CCD (charge coupled device), etc.) formed on the reading surface, and the information read from the face of the original is converted into an electric signal, thereby finally forming the image data of the original.

When the original is smaller than the reading range of the reading surface, the back (which is the reading surface of the original cover, can be the background of the original, and is therefore called a background board) of the original cover appears around the original viewed from the reading surface. As a result, when an image is read, the background board as well as the face of the original is read. Therefore, the image data formed in this case shows the background board around the original.

Thus formed image data is, for example, printed on paper, handled by OCR processing of the character area in the image data by partially cutting out the image data, correcting after rotation of the image data, storing the image data as is in a database, etc. for various uses.

Normally, when the OCR processing is performed, it is convenient for an original to be processed to follow a standard document in which printing positions are predetermined as in a listing.

When the standard document is used in the OCR processing, the standard document is converted to image data, and the image data of the standard document (hereinafter referred to also as a standard document image) is appropriately handled in correction processing such as a rotation amendment, etc. If the printing positions are set in advance on the standard document image as a basis of the reference positions on the standard document image, then the printing position can be estimated from the amended standard document image. Then, by the OCR processing performed on the estimated printing position, character recognition processing is performed on the estimated printing positions, thereby retrieving desired character information.

However, there are a number of cases in which the frames of the original of a standard document such as the above-mentioned listing, etc. have white margins. If an original of a standard document smaller than a reading range of the image reader is read using the background board in the same or similar color as the margin, then the obtained and formed image data indicates no boundary between the original of a standard document and the background board. That is, the boundary which is to appear actually appears as the boundary portion and the surrounding portion in the same color. Additionally, since the arrangement to the reading surface of the original of a standard document set facing the reading surface of the image reader is different each time the original is set, the angle and the arrangement of the original of a standard document captured in the formed image data are different among image data. Therefore, to perform the OCR processing on the image data, a new step of specifying the state (angle and arrangement) of the original of a standard document captured in the image data is required.

Conventionally, the image reader is a very expensive device for a special use, and is designed to detect the state of an original of a standard document captured in the image data by setting a black background board in advance.

Thus, by reading each original of a standard document using the background board, the state of the original of a standard document based on the boundary indicating the definite gray scale difference between the black of the background board indicated in the read image data of the original of a standard document and the white of the frames of the original of a standard document is specified.

A technology similar to the above-mentioned technology is applied to a copying machine. It is different from the technology of using different colors between the frames of an original and the background board, but is designed to specify the area of an original different in the RGB arrangement from the background board by allowing the image reader to recognize the RGB arrangement of the background board set in advance to be arbitrarily rearranged.

SUMMARY OF THE INVENTION

The present invention aims at providing the technology of detecting the edge of an original from the image data which includes the original and the background board captured around the original, and is read from an arbitrary combination of an original and a background board selected from among several types of originals and background boards. The technology is provided as a boundary detection method, a computer-readable handy storage medium storing its program, an image processing device, and a copying machine based on detecting the boundary between areas having different features among arbitrary adjacent areas in the image data, and is realized by extracting feature information depending on all pixels in a unit area for each unit area of the image data, obtaining a difference in the feature information between adjacent unit areas for an arbitrary unit area, and determining as the boundary the unit area whose difference is at or higher than a predetermined level.

BRIEF DESCRIPTION OF THE DRAWINGS

FIG. 7 shows measured data of the feature amount obtained in the rectangular area 210 shown in FIG. 2;

FIG. 11 shows an example of a flow of the operations performed by an provisional edge determination unit 104;

FIG. 20 shows an example of a flow of the entire process for designation of the edge of an original;

FIG. 22 shows an example (1) of the hardware for which the image processing technology is used;

FIG. 27 shows a flow of generating a black background board image.

DESCRIPTION OF THE PREFERRED EMBODIMENTS

Figure 1:
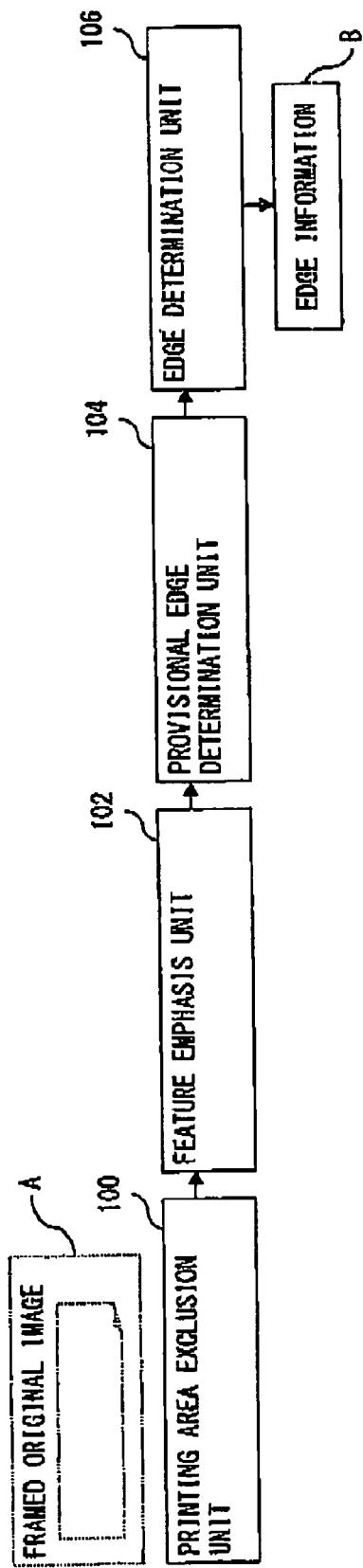
FIG. 1 is a block diagram of the image processing device according to an embodiment of the present invention.

An aspect of the boundary detection method according to a embodiment of the present invention is based on detecting the boundary between areas having different features among arbitrary adjacent areas in the image data, and is realized by extracting feature information depending on all pixels in a unit area for each unit area of the image data, obtaining a difference in the feature information between adjacent unit areas for an arbitrary unit area, and determining as the boundary the unit area whose difference is at or higher than a predetermined level.

Another aspect of the boundary detection method according to a embodiment of the present invention is based on detecting the boundary between areas having different pixel arrangements among arbitrary adjacent areas in the image data, and is realized by extracting image frequency information for each unit area of the image data, determining the representative feature information according to the extracted image frequency information, obtaining a difference in the representative feature information between adjacent unit areas for an arbitrary unit area, and determining as the boundary the unit area whose difference is at or higher than a predetermined level.

Another aspect of the boundary detection method according to an embodiment of the present invention is based on detecting the boundary between areas having different pixel arrangements among arbitrary adjacent areas in the image data, and is realized by extracting first image frequency information of predetermined types for each first unit area of the image data, defining a value obtained by adding a predetermined weight to each type of the extracted first image frequency information as representative feature information, provisionally determining as the boundary a first unit area whose variance from the representative feature information of an adjacent first unit area is at or higher than a predetermined level in an arbitrary first unit area, extracting second image frequency information for each second unit area smaller than the first unit area in the first unit area provisionally determined as the boundary and a vicinal area of the first unit area, and determining as the boundary a second unit area whose value based on the variance from the second image frequency information of the adjacent second unit area is at or higher than a predetermined level in an arbitrary second unit area.

Another aspect of the boundary detection method according to an embodiment of the present invention is based on detecting, in the input image data of an original whose front image is input with a background board as its background, the boundary between the background board and the original for the input image data of an image of a part of the background board and the edge of the original input in the same color, and is realized by performing a Fourier-transform on each first unit area of the input image data, extracting first image frequency information of predetermined types obtained by the Fourier-transform processing, defining a value obtained by adding a predetermined weight to each type of the extracted first image frequency information as representative feature information for each of the first unit areas, provisionally determining as the boundary a corresponding area on an approximate line obtained by performing line approximation on a first unit area whose variance from the representative feature information about an adjacent first unit area is at or higher than a predetermined level in an arbitrary first unit area, performing a Fourier-transform on each second unit area smaller than the first unit area in the first unit area provisionally determined as the boundary and a vicinal area of the first unit area, extracting second image frequency information of predetermined types obtained by the Fourier-transform, defining as representative feature information a value obtained by adding a predetermined weight to each type of the extracted second image frequency information for each second unit area, performing a Wavelet transform on the representative feature information, performing line approximation on a second unit area whose value for each second unit area obtained by the Wavelet transform is at or higher than a predetermined level, and determining the position on the approximate line obtained by the line approximation as the boundary.

In each of the above-mentioned aspects of the boundary detection method, it is desired to specify a printing area for the image data, or the input image data, and, in the subsequent step, to use the image data or the input image data excluding the printing area.

It is also desired that the feature information or the image frequency information are a high frequency element, a low frequency element, a direct current element, and a frequency distribution contained in the unit area from which the feature information or the image frequency information are extracted.

An aspect of the program according to an embodiment of the present invention is based on allowing a computer to detect the boundary between areas having different features among arbitrary adjacent areas in the image data, and is realized by the function of extracting feature information depending on all pixels in a unit area for each unit area of the image data, the function of obtaining a difference in feature information between adjacent unit areas for an arbitrary unit area, and the function of determining as the boundary the unit area whose difference is at or higher than a predetermined level.

Another aspect of the program according to an embodiment of the present invention is based on allowing a computer to detect the boundary between areas having different pixel arrangements among arbitrary adjacent areas in the image data, and is realized by the function of extracting image frequency information for each unit area of the image data, the function of determining the representative feature information according to the extracted image frequency information, the function of obtaining a difference in the representative feature information between adjacent unit areas for an arbitrary unit area, and the function of determining as the boundary the unit area whose difference is at or higher than a predetermined level.

Another aspect of the program according to an embodiment of the present invention is based on allowing a computer to detect the boundary between areas having different pixel arrangements among arbitrary adjacent areas in the image data, and is realized by the function of extracting first image frequency information of predetermined types for each first unit area of the image data, the function of defining a value obtained by adding a predetermined weight to each type of the extracted first image frequency information as representative feature information, the function of provisionally determining as the boundary a first unit area whose variance from the representative feature information of an adjacent first unit area is at or higher than a predetermined level in an arbitrary first unit area, the function of extracting second image frequency information for each second unit area smaller than the first unit area in the first unit area provisionally determined as the boundary and a vicinal area of the first unit area, and the function of determining as the boundary a second unit area whose value based on the variance from the second image frequency information of the adjacent second unit area is at or higher than a predetermined level in an arbitrary second unit area.

Another aspect of the program according to a embodiment of the present invention is based on allowing a computer to detect, in the input image data of an original whose front image is input with a background board as its background, the boundary between the background board and the original for the input image data of an image of a part of the background board and the edge of the original input in the same color, and is realized by the function of performing a Fourier-transform on each first unit area of the input image data, the function of extracting first image frequency information of predetermined types obtained by the Fourier-transform processing, the function of defining a value obtained by adding a predetermined weight to each type of the extracted first image frequency information as representative feature information for each of the first unit area, the function of provisionally determining as the boundary a corresponding area on an approximate line obtained by performing line approximation on a first unit area whose variance from the representative feature information about an adjacent first unit area is at or higher than a predetermined level in an arbitrary first unit area, the function of performing a Fourier-transform on each second unit area smaller than the first unit area in the first unit area provisionally determined as the boundary and a vicinal area of the first unit area, the function of extracting second image frequency information of predetermined types obtained by the Fourier-transform, the function of defining as representative feature information a value obtained by adding a predetermined weight to each type of the extracted second image frequency information for each second unit area, the function of performing a Wavelet transform on the representative feature information, the function of performing line approximation on a second unit area whose value for each second unit area obtained by the Wavelet transform is at or higher than a predetermined level, and the function of determining the position on the line approximation obtained by the line approximation as the boundary.

In each of the above-mentioned aspects of the program, it is desired to realize the functions of specifying a printing area for the image data or the input image data, and then using the image data or the input image data excluding the printing area.

It is also desired that the feature information or the image frequency information are a high frequency element, a low frequency element, a direct current element, and a frequency distribution contained in the unit area from which the feature information or the image frequency information is extracted.

An aspect of the image processing device according to an embodiment of the present invention is based on detecting the boundary between areas having different features among arbitrary adjacent areas in the image data, and comprises a feature emphasis unit for extracting feature information depending on all pixels in a unit area for each unit area of the image data, and a boundary determination unit for obtaining a difference in the feature information between adjacent unit areas for an arbitrary unit area, and determining as the boundary the unit area whose difference is at or higher than a predetermined level.

Another aspect of the image processing device according to an embodiment of the present invention is based on detecting the boundary between areas having different pixel arrangements among arbitrary adjacent areas in the image data, and comprises a feature emphasis unit for extracting image frequency information for each unit area of the image data, and a boundary determination unit for determining the representative feature information according to the extracted image frequency information, obtaining a difference in representative feature information between adjacent unit areas for an arbitrary unit area, and determining as the boundary the unit area whose difference is at or higher than a predetermined level.

Another aspect of the image processing device according to an embodiment of the present invention is based on detecting the boundary between areas having different pixel arrangements among arbitrary adjacent areas in the image data, and comprises a feature emphasis unit for extracting first image frequency information of predetermined types for each first unit area of the image data, a boundary provisional determination unit for defining a value obtained by adding a predetermined weight to each type of the extracted first image frequency information as representative feature information, and provisionally determining as the boundary a first unit area whose variance from the representative feature information of an adjacent first unit area is at or higher than a predetermined level in an arbitrary first unit area, and a boundary determination unit for extracting second image frequency information for each second unit area smaller than the first unit area in the first unit area provisionally determined as the boundary and a vicinal area of the first unit area, and determining as the boundary a second unit area whose value based on the variance from the second image frequency information of the adjacent second unit area is at or higher than a predetermined level in an arbitrary second unit area.

Another aspect of the image processing device according to an embodiment of the present invention is based on detecting, in the input image data of an original whose front image is input with a background board as its background, the boundary between the background board and the original for the input image data of an image of a part of the background board and the edge of the original input in the same color, and comprises a feature emphasis unit for performing a Fourier-transform on each first unit area of the input image data, and extracting first image frequency information of predetermined types obtained by the Fourier-transform processing, a boundary provisional determination unit for defining a value obtained by adding a predetermined weight to each type of the extracted first image frequency information as representative feature information for each of the first unit area, and provisionally determining as the boundary a corresponding area on an approximate line obtained by performing line approximation on a first unit area whose variance from the representative feature information about an adjacent first unit area is at or higher than a predetermined level in an arbitrary first unit area, and a boundary determination unit for performing a Fourier-transform on each second unit area smaller than the first unit area in the first unit area provisionally determined as the boundary and a vicinal area of the first unit area, extracting second image frequency information of predetermined types obtained by the Fourier-transform, defining as representative feature information a value obtained by adding a predetermined weight to each type of the extracted second image frequency information for each second unit area, performing a Wavelet transform on the representative feature information, performing line approximation on a second unit area whose value for each second unit area obtained by the Wavelet transform is at or higher than a predetermined level, and determining the position on the line approximation obtained by the line approximation as the boundary.

In each of the above-mentioned aspects of the image processing device, it is desired to further comprise a printing area exclusion unit for excluding a printing area of the image data.

It is also desired that the feature information or the image frequency information are a high frequency element, a low frequency element, a direct current element, and a frequency distribution contained in the unit area from which the feature information or the image frequency information are extracted.

The image processing device can further comprise an image reading unit for optically reading an original and generating the image data of the original.

According to an embodiment of the present invention, feature information such as an image frequency, etc. determined for the entire unit pixels is extracted for each unit area of image data. Therefore, if two sheets of papers having different surface states are captured in the image data, the two sheets of paper can be extracted as having different feature information about their states eventhough the two sheets of paper are the same color.

Then, if the variance between the adjacent areas is obtained according to the extracted feature information, the variance increases at the boundary between the two sheets of paper having different surface states. Therefore, the position of the increase in the variance of the image can be designated as the boundary between the two sheets of paper.

Furthermore, if there is a white original with black printed characters and another original of the same color adjacent to the white original captured in image data, it is possible to first exclude a darker printing area. Therefore, the position of the boundary between them can be easily designated.

The embodiment of the present invention is described below in detail by referring to the attached drawings.

The image processing device according to an embodiment of the present invention is an image reader for reading an original image with a background board (the member which is incorporated into an original cover for holding an original from the back of the original when the original is set with the face contacting the optical read surface, and is then set to contact the back of the original cover) provided for a scanner, a copying machine, etc.

According to the embodiment of the present invention, the boundary between an original image and a background board image is detected in a framed original image (hereinafter the original image and the background board image formed around the original image are collectively referred to as the framed original image) having the original image and the image of the background board (hereinafter referred to as a background board image) read by the image reader around the original image.

It is assumed that the original read by the image reader has a white marginal area around, and the color of the background board is white, that is, the same color as the marginal area.

For convenience, the original is assumed to be a rectangular paper, and a printing area in its entirety (for example, a listing, etc.) on which characters and ruled lines are printed excluding the marginal area of the original.

FIG. 1 is a block diagram of the image processing device according to an embodiment of the present invention.

As shown in FIG. 1, the image processing device comprises a printing area exclusion unit 100, a feature emphasis unit 102, an provisional edge determination unit 104, and an edge determination unit 106. The printing area exclusion unit 100 receives a framed original image A as input information, and the edge determination unit 106 outputs edge information B as the output information in response to the input information.

The framed original image shown in FIG. 1 is generated by reading the face of the original in a pixel unit by a well-known image reader unit not shown in the attached drawings, and then electrically converting the read information. The generated framed original image A has the gray level information about R (red), G (green), and B (blue) for each pixel, or the image information based on the management of a look-up table.

Figure 2:
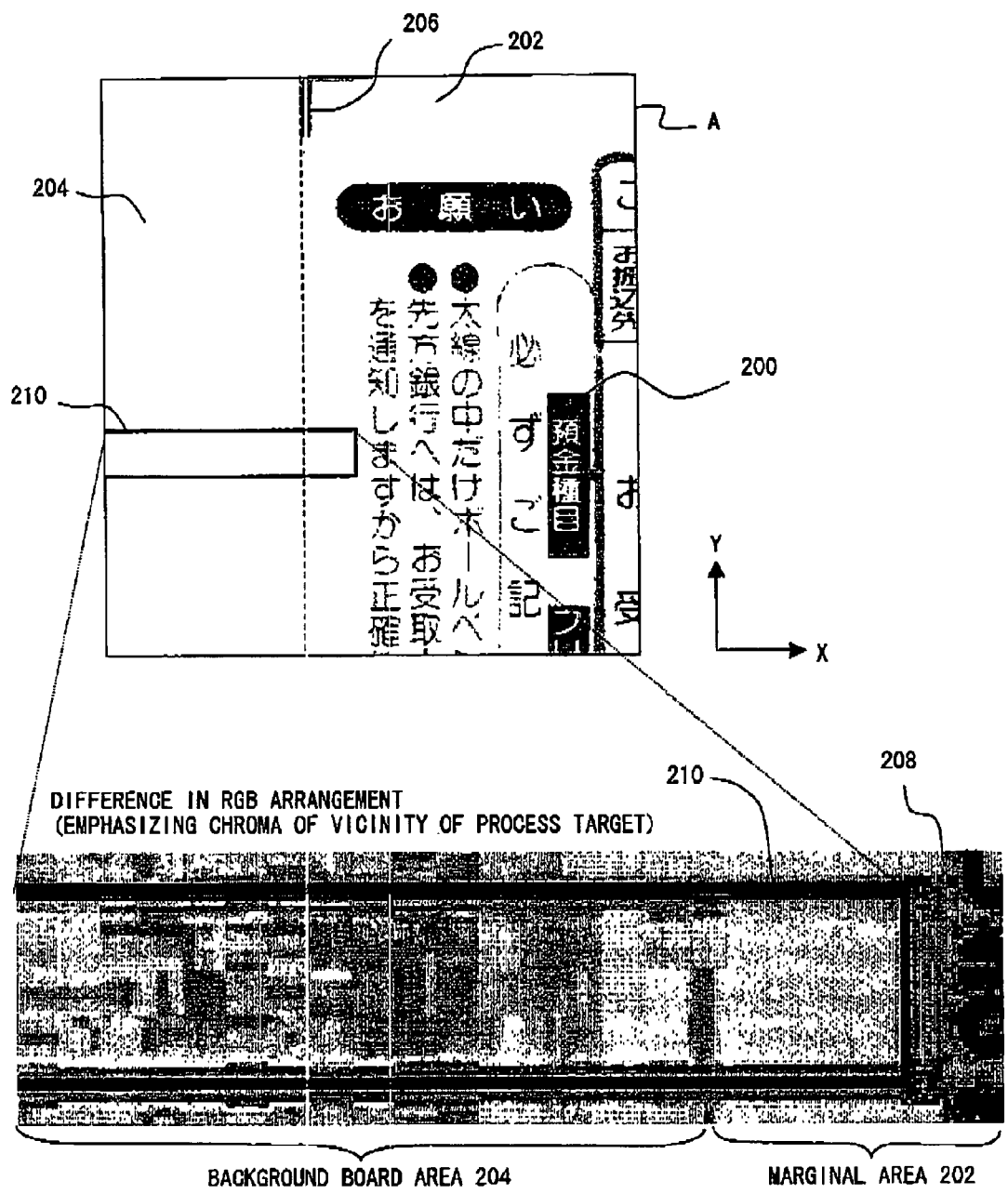
FIG. 2 shows an example of displaying a framed original image.

Before the explanation of each of the above-mentioned units, the feature of the framed original image is explained first by referring to FIG. 2.

FIG. 2 shows an example of the framed original image A shown in FIG. 1 generated as described above on the display screen (hereinafter referred to as an X-Y coordinate plane or an image plane) with the horizontal direction represented by an X axis and the vertical direction represented by a Y axis on the display device not shown in the attached drawings.

For comprehensibility, the framed original image A shown in FIG. 2 indicates an original image to the right of the broken line, and a background board image read from a part of the background board for out of the area of the original to the left of the broken line. The broken line shown in FIG. 2 is the edge of the original shown for explanation. In practice, the broken line does not exist as the boundary between the original image and the background board image.

In FIG. 2, the area containing characters, ruled lines, symbols, etc. is referred to as a printing area 200, the marginal portion of the original image around the printing area 200 is referred to as a marginal area 202, and the area containing the background board is referred to as a background board area 204. The printing area 200 shown in FIG. 2 contains Japanese characters. However, it is not necessary to understand these characters in understanding the embodiments of the present invention. Therefore, the embodiments of the present invention can be sufficiently understood by replacing these characters with the characters of other languages and symbols. This also holds true with the Japanese words and characters shown in FIGS. 4A and 18A referenced later.

When the edge of an original image is specified, the difference in gray scale value can be definitely detected in a portion 206 where the shadow of the edge is captured, the edge of the original image can be designated in this position.

However, in the position of the edge where no shadow of an edge is captured in the framed original image A shown in FIG. 2 (the broken line portion extending downwards from the portion 206 where the shadow of an edge is captured in FIG. 2), the color of the background board is similar to the color of the margin as clearly shown in FIG. 2, and there are a series of data where there is no color difference between the adjacent pixels at the boundary. Therefore, an edge cannot be designated in the position based on the difference in gray scale value.

However, the state of the background board (for example, the surface is coarse, the surface is smooth, the type of material is different, etc.) is usually different from the state of the margin of an original (for example, the surface is coarse, the surface is smooth, the type of material is different, etc.)

Therefore, by extracting the difference in state as some feature amounts, the position of an edge can be designated as follows.

An enlarged view 208 shown in FIG. 2 is a partially enlarged image of a rectangular area 210 and the vicinity of the rectangular area when the rectangular area 210, which includes the background board area 204 of the framed original image A and the marginal area 202 containing the boundary between them, and the vicinity of the rectangular area are shown with the chroma emphasized to clearly indicate the difference between the above-mentioned states.

By emphasizing the chroma of the framed original image A, the difference in RGB arrangement depending on the difference in the above-mentioned states between the marginal area 202 and the background board area 204 is emphasized, and the boundary can be visually discriminated based on the difference in area as shown in FIG. 2.

Therefore, by making use of the above-mentioned feature, each unit of the image processing device capable of designating the boundary between the original area of a framed original image and the background board area is described below by referring to the framed original image A shown in FIG. 2.

The printing area exclusion unit 100 shown in FIG. 1 scans each pixel of the framed original image A, designates the printing area 200 shown in FIG. 2 by determining as a printing area the pixels whose gray scale values are 200 or smaller in the gray scale values of the RGB obtained by the scanning, and excludes the pixels from probable pixels forming the edge.

The feature emphasis unit 102 shown in FIG. 1 extracts a feature amount (for example, the image frequency (or a spectrum) contained in the pixel area, the frequency distribution, etc.) depending on a specified range (also referred to as a block) from the framed original image A. For example, a two-dimensional fast-Fourier-transform is performed in a unit 32 pixels long×4 pixels wide, the spectrum of each area is obtained, and each average value of the high frequency element, the low frequency element, and the direct current element of the obtained spectrum, and the frequency distribution of the spectrum can be defined as the feature amount of the area.

The predetermined range can be, for example, 1 pixel long and m pixel wide (1 and m are integers), etc.

The unit area of each pixel specified for the predetermined range of the framed original image on the image plane is referred to as a pixel area.

The feature emphasis unit 102 can also extract the feature amount of each pixel area excluding the printing area 200 shown in FIG. 2 designated by the printing area exclusion unit 100.

The provisional edge determination unit 104 provisionally determines the position corresponding to the edge of the original on the framed original image based on the feature amount extracted for each pixel area by the feature emphasis unit 102 (for example, the value obtained by adding up the feature amounts of the pixel area using a predetermined weight is defined as a difference value, the peak of the end of the difference values is defined as an edge, the obtained edge is used in line approximation, and the obtained line is provisionally determined as the edge).

The edge determination unit 106 shown in FIG. 1 extracts various feature amounts in a unit of a pixel area of a range narrower than the pixel area defined as a unit of extracting a feature amount by the feature emphasis unit 102 from the provisionally determined position of the edge by the provisional edge determination unit 104 and the vicinal area on the image plane, and finally determines the edge position of the original on the framed original image based on the feature amount (for example, a one-dimensional fast-Fourier-transform is performed in a unit 32 pixels long×1 pixels wide on the provisionally determined edge position and the vicinal area, a Wavelet transform is performed on the feature amount extracted in the above-mentioned transform, line approximation is further performed on the peak position based on the value obtained in the above-mentioned transform, and position on the approximate line is defined as the edge position, etc.)

Thus, the edge information B as shown in FIG. 1 is output.

Described below is an example of an operation flow of each unit of the image processing device according to an embodiment of the present invention.

In the scanning method used in processing an image in the present example, unless otherwise specified, each pixel of the framed original image A shown in FIG. 2 is scanned horizontally toward the right on the same pixel string. When the pixel string is processed, the row below is similarly processed horizontally on the same pixel string in a unit 32 pixels long, and the similar process continues until the lowest row of the framed original image A has been processed.

For comprehensibility of the flow of the operations, the explanation is given by referring to the charts showing the measurement results, etc.

Figure 3:
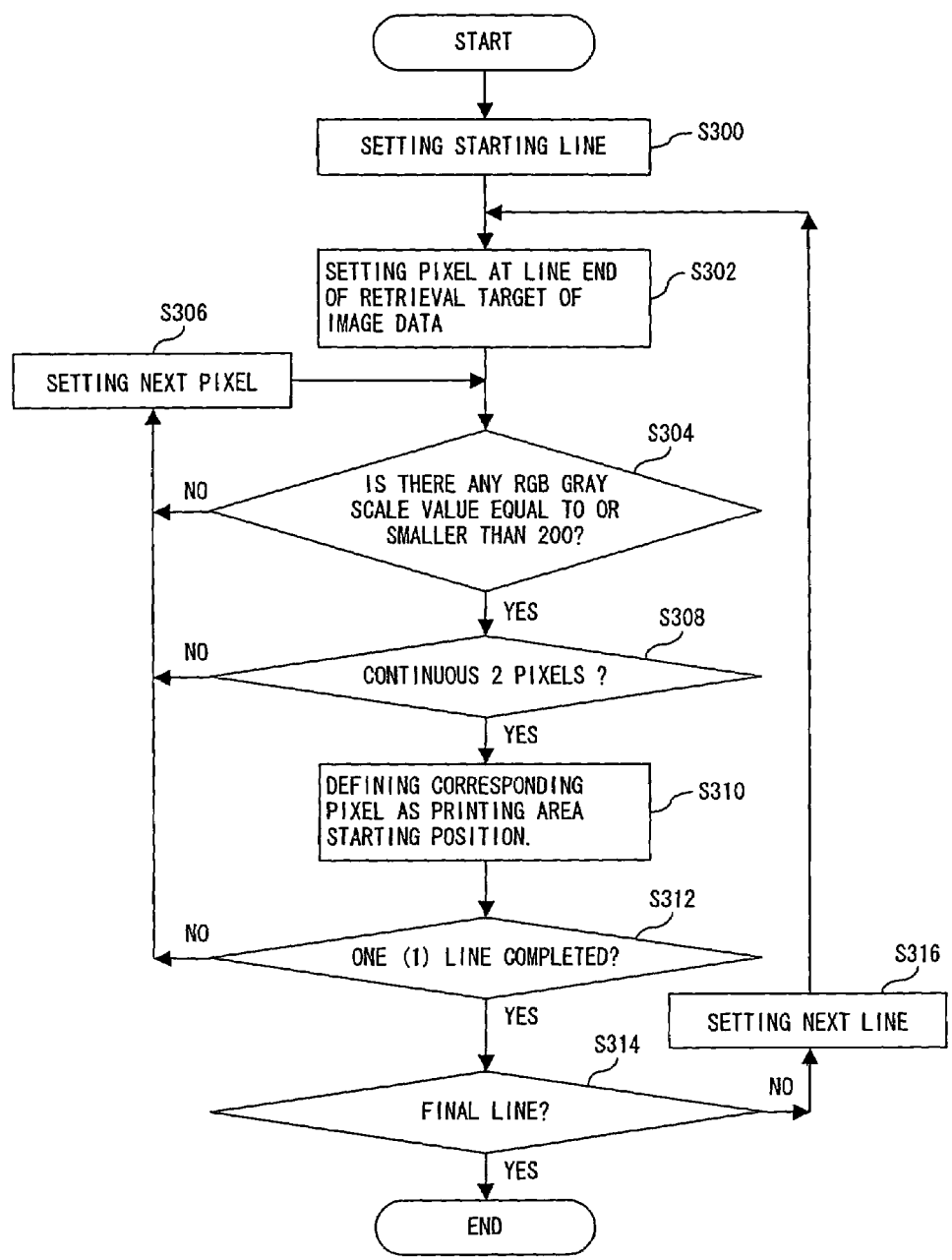
FIG. 3 shows an example of a flow of the operations performed by a printing area exclusion unit 100.

FIG. 3 shows an example of an operation flow performed by the printing area exclusion unit 100 shown in FIG. 1.

In the operation flow shown in FIG. 3, the position of the start line from which data is first read on the image plane of the framed original image A shown in FIG. 2 is set as the position of the upper limit of the image A shown in FIG. 2 (S300).

Then, the pixel at the leftmost of the set line as shown in FIG. 2 is set as a read target (S302)

The RGB gray scale value of the set pixel is read, and it is determined whether or not there is a read value not exceeding a reference RGB gray scale value of 200 for exclusion of a printing area (S304).

The reference RGB gray scale value for determination can be appropriately set depending on the original.

If the RGB gray scale value of the read pixel exceeds 200 in step S304, then it is determined that the pixel does not refer to a printing area, and the right pixel in the same line is set as the next read target (S306).

On the other hand, if the RGB gray scale value of the read pixel is equal to or smaller than 200 in step S304, then it is provisionally determined that there is a printing area in the area, and control is passed to the noise determining process in step S308.

In step S308, it is determined on the pixels provisionally set in step S304 as including a printing area whether or not there are pixels continuously located on an image plane provisionally determined as a printing area.

If it is determined in step S308 that there are no continuous pixels, then control is passed to step S306, and the pixel next to the current processing target pixel in the same line is set as a read target, and the process is performed in the above-mentioned steps.

Those that are no two continuous pixels provisionally set as a printing area, there is the possibility that the pixel refers to noise due to dust, etc. and has nothing to do with a printing area. And, the number of continuous pixels for determination reference can be appropriately set.

If it is determined in step S308 that there are continuous pixels, then the corresponding pixel is set as a printing area 200 detected first from the leftmost pixel of the image A shown in FIG. 2 (S310).

Then, in step S312, it is determined whether or not there are unprocessed pixels in the current line.

If it is determined in step S312 that there are still pixels to be processed in the current line, then control is passed to step S306, and the similar processes are performed on the remaining pixels.

If it is determined in step S312 that there are no pixels to be processed in the current line, then it is determined whether or not the current line is the final line of the lower most portion of the image A shown in FIG. 2 (S314).

If it is determined in step S314 that the current line is not the final line, then a line is set in the position immediately below the current line on the image plane (S316), and the processes in and after step S302 are repeatedly performed from the leftmost of the set line.

When the scanning up to the final line where the scanning operation is completed on the image A shown in FIG. 2 is performed, it is determined in step S314 that the current line is the final line, thereby terminating the process.

Figure 4B:
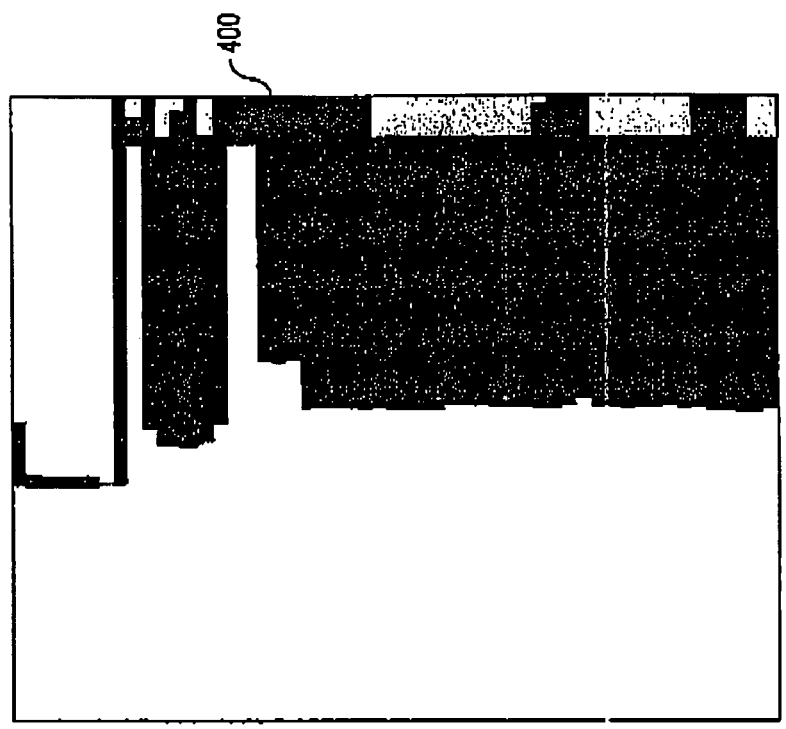
FIGS. 4A and 4B show the comparison between the printing area specified by the printing area exclusion unit 100 and the original image.
Figure 4A:
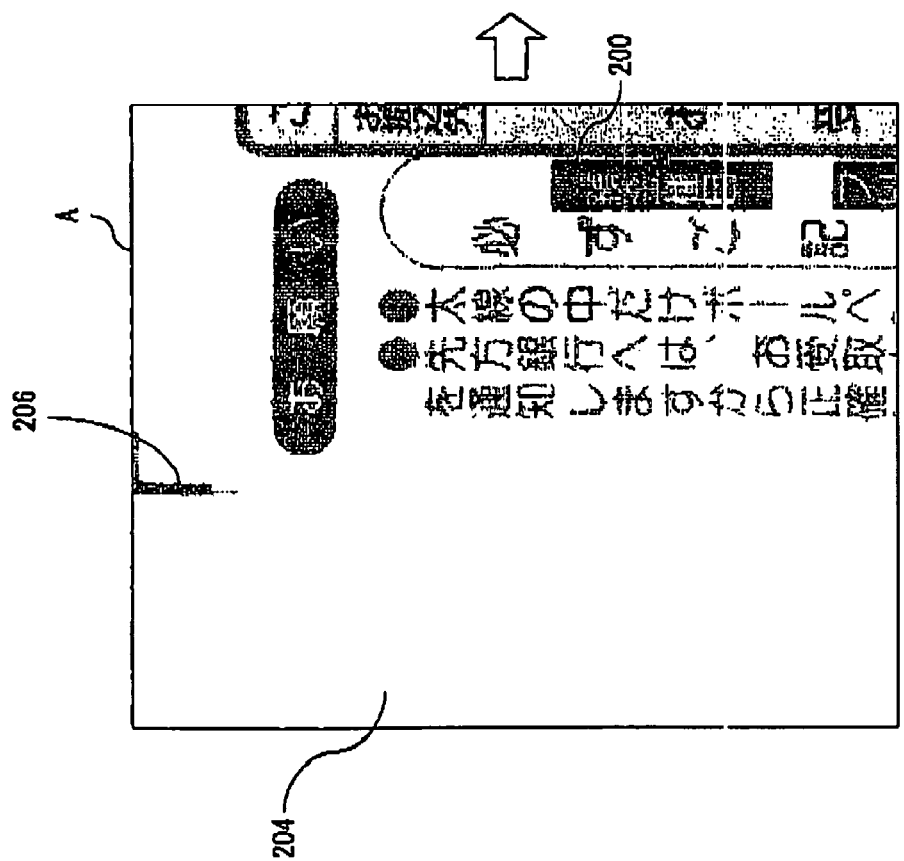

FIGS. 4A and 4B show the comparison between the printing area designated in the above-mentioned operation flow and the original image.

FIG. 4A shows the framed original image A shown in FIG. 2 before the above-mentioned operation flow is operated. FIG. 4B shows printing area designated by the above-mentioned operation flow in black.

As shown in FIG. 4B, the printing area 200 and the portion 206 in which the shadow of the edge shown in FIG. 2 are captured are designated as a printing area 400.

Thus, in the framed original image A input into the printing area exclusion unit 100 shown in FIG. 1, the printing area 200 and the portion 206 in which the shadow of the edge is captured are designated as a printing area in this example.

In the subsequent processes, the designated printing area 400 shown in FIG. 4B can be excluded.

Figure 5:
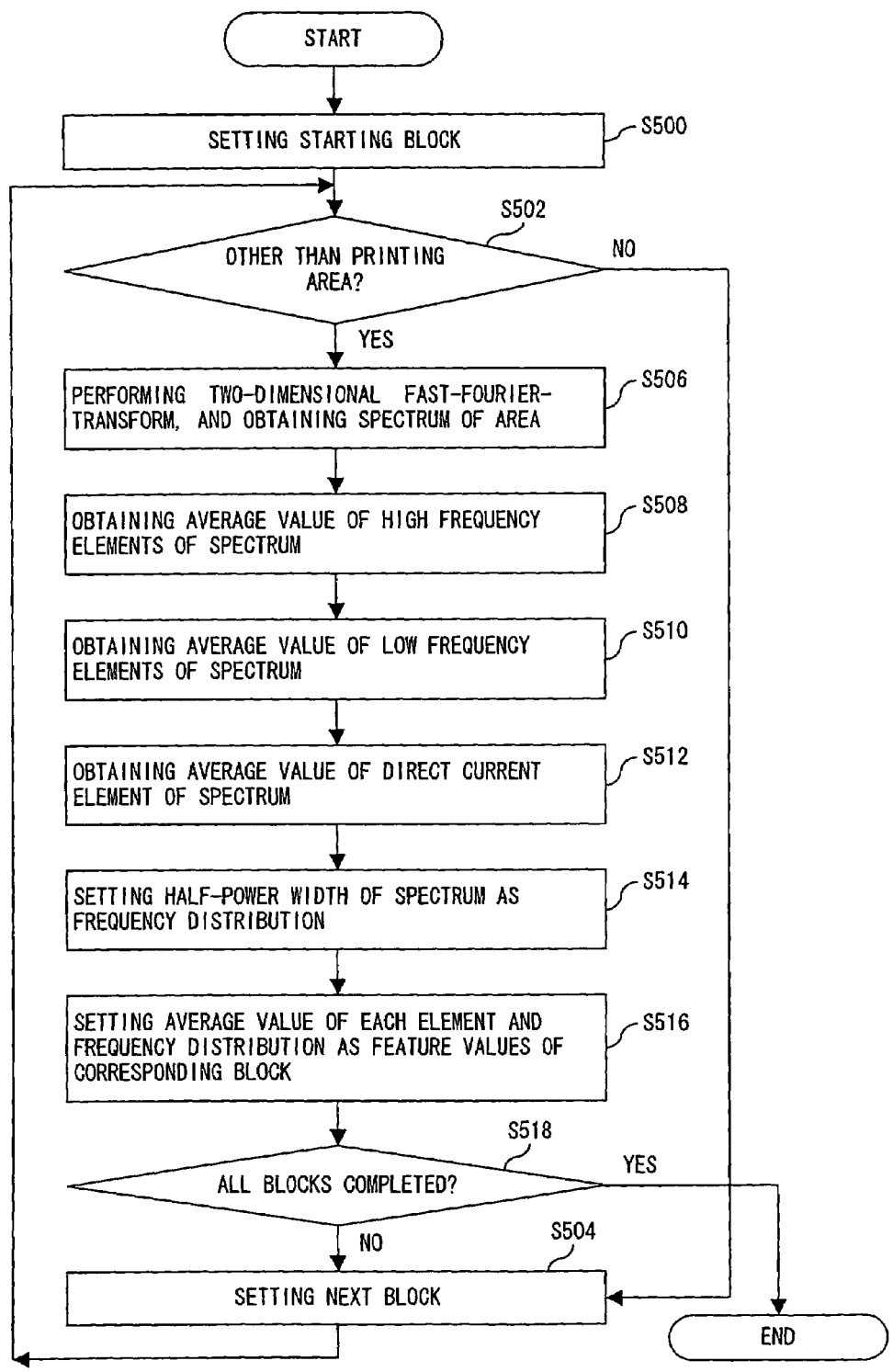
FIG. 5 shows an example of the operation performed by a feature emphasis unit 102.

FIG. 5 shows an example of an operation flow followed by the feature emphasis unit 102 shown in FIG. 1.

This operation flow is followed on the image A in which the printing area exclusion unit 100 shown in FIG. 1 designates a printing area.

Figure 6:
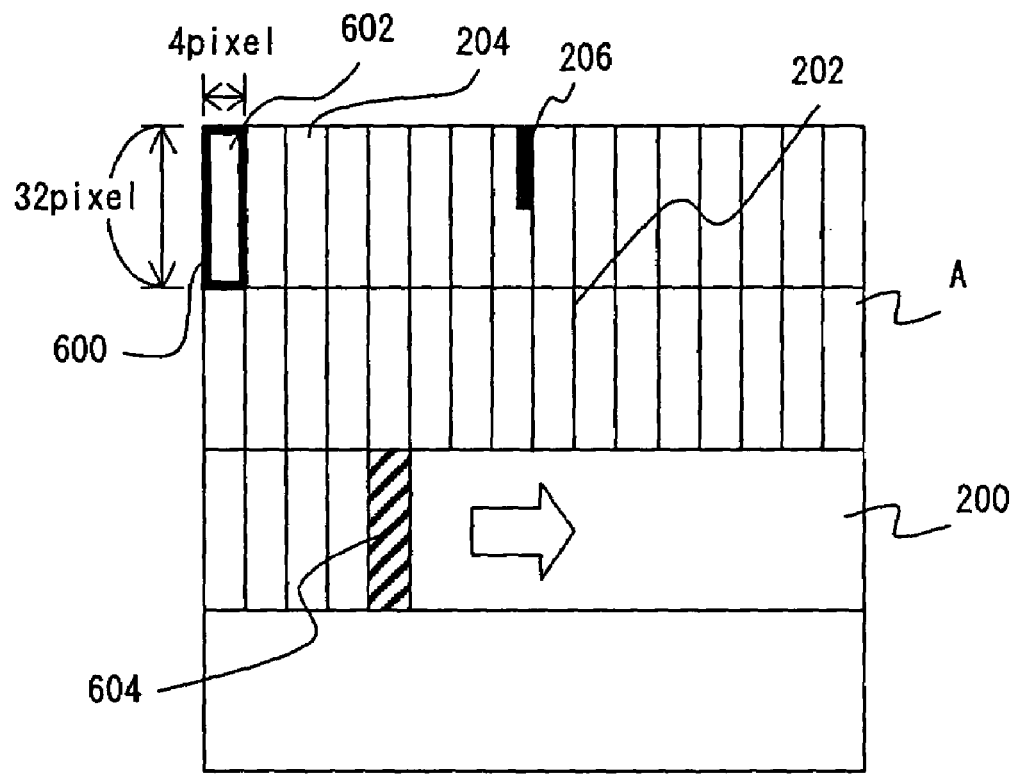
FIG. 6 shows an example of the case in which a framed original image A is scanned after being divided into unit pixel areas.

Furthermore, in the present operation flow, each pixel area obtained by dividing the framed original image A indicated on the image plane in a unit of an area of a range 600 (in this example, a block of 32 pixels long×4 pixels wide) shown in FIG. 6 is used as a unit of a process unless otherwise specified.

In the operation flow shown in FIG. 5, a pixel area 602 specified by the range 600 at the upper left corner of the framed original image A shown in FIG. 6 is set as a starting block to be processed (S500).

Then, it is determined according to the information about the printing area 400 shown in FIG. 4B of the pixel designated by the printing area exclusion unit 100 shown in FIG. 1 whether or not the pixel area (the pixel area 602 in the present stage, and the subsequent stages) contains the printing area 400 shown in FIG. 4B (S502).

In step S502, if it is determined that printing area 400 shown in FIG. 4B is contained in the pixel area, then a pixel area adjacent to the pixel area in the scanning direction of the pixel area in the image A shown in FIG. 6 is set again as an area to be processed (S504).

If it is determined in step S502 that the printing area 400 shown in FIG. 4B is not contained in the pixel area, then the well-known two-dimensional fast-Fourier-transform (hereinafter referred to as 2DFFT for short) is performed on each pixel area, and the spectrum of the pixel area is obtained (S506).

Then, an average value of the high frequency elements ($\frac{1}{2}\pi \leq \omega < \frac{3}{4}\pi$ in the present example, where $\omega$ is a variable indicating a frequency) of the spectrum obtained in the pixel area is obtained (S508).

An average value of the low frequency elements ($0 \leq \omega < \frac{1}{2}\pi$ in the present example) of the spectrum obtained in the pixel area is obtained (S510).

Then, an average value of the direct current element ($\omega=0$ in the present example) of the spectrum obtained in the pixel area is obtained (S512).

FIG. 7 is the measured data of the average values of various elements obtained for each pixel area in a unit 32 pixels long×4 pixels wide in the rectangular area 210 (32 pixels long×144 pixels wide). The measured data is computed for each of the RGB data, and the variance of each of the RGB data is easily checked.

The x coordinate shown in FIG. 7 corresponds to the direction of the x axis of the image A shown in FIG. 2, and the value of the number of pixels that is counted toward the right with the leftmost point of the rectangular area 210 shown in FIG. 2 defined as the origin of the x coordinate is shown.

In FIG. 7, corresponding to the positions specified by the x coordinates indicating the positions of the number of pixels from the leftmost end of the rectangular area 210 shown in FIG. 2, a gray scale value indicates the direct current element (direct current element R, direct current element G, and direct current element B) of each of the RGB data, the spectrum value indicates the low frequency element (low frequency element R, low frequency element G, and low frequency element B) of each of the RGB data, and the spectrum value indicates the high frequency element (high frequency element R, high frequency element G, and high frequency element B) of each of the RGB data.

Figure 8:
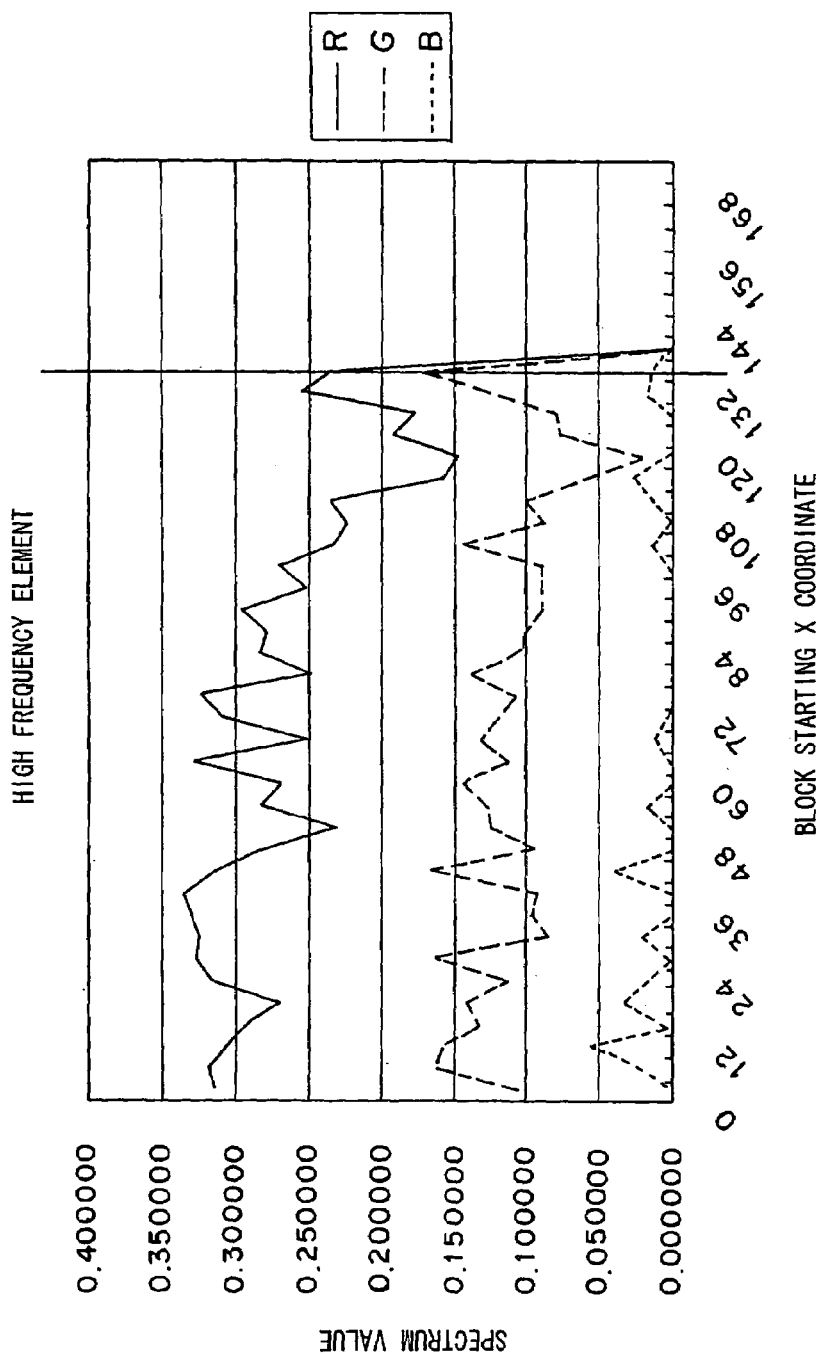
FIG. 8 is a graph of the high frequency element based on the measured data shown in FIG. 7.
Figure 9:
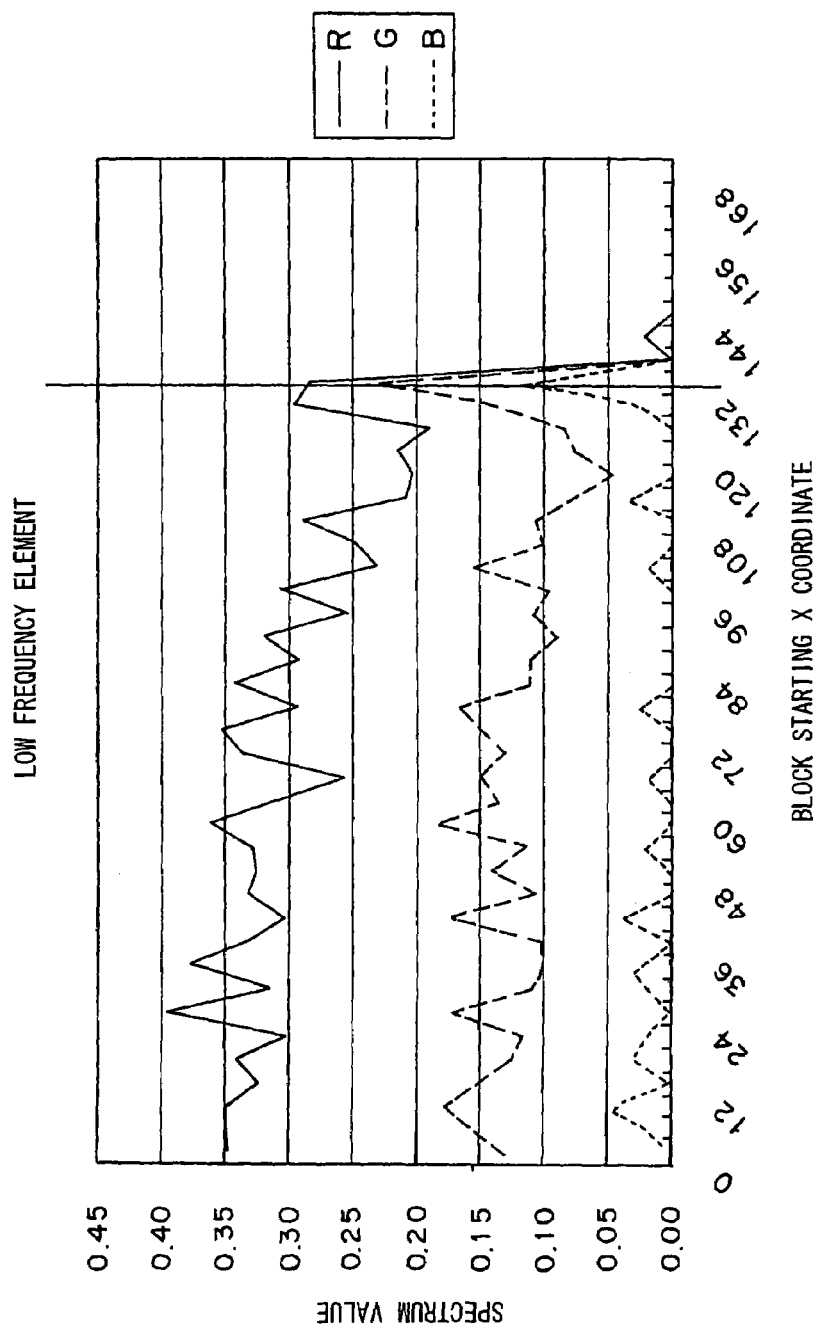
FIG. 9 is a graph of the low frequency element based on the measured data shown in FIG. 7.
Figure 10:
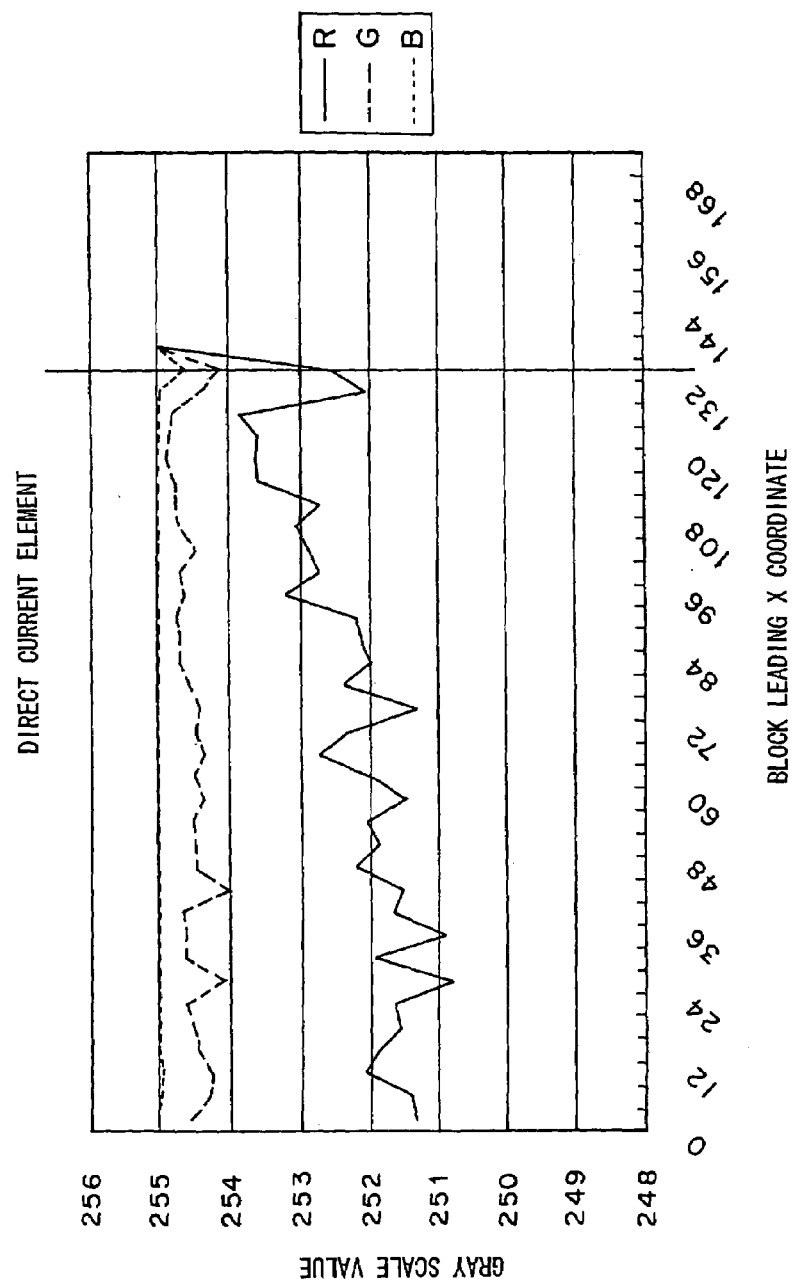
FIG. 10 is a graph of the direct current element based on the measured data shown in FIG. 7.

When the value of each element is shown in a line graph, the graphs shown in FIGS. 8 through 10 are obtained.

FIG. 8 is a graph relating to the high frequency element in which the horizontal axis indicates the positions of the number of pixels (positions of the number of pixels at the leftmost end of each pixel area), the vertical axis indicates a spectrum value, and the variance of a spectrum is shown for each of the RGB data.

FIG. 9 is a graph relating to the low frequency element in which, as in the graph relating to the high frequency element, the horizontal axis indicates the positions of the number of pixels (positions of the number of pixels at the leftmost end of each pixel area), the vertical axis indicates a spectrum value, and the variance of a spectrum is shown for each of the RGB data.

FIG. 10 is a graph relating to the direct current element in which the horizontal axis indicates the positions of the number of pixels (positions of number of pixels at the leftmost end of each pixel area), the vertical axis indicates a gray scale value, and the variance of a gray scale value is shown for each of the RGB data.

As indicated by the line graph shown in FIGS. 8 through 10, the position of the x coordinate of 136 shows the sharpest fluctuation. Also in FIGS. 7 through 10, as indicated by the solid line in the position of the x coordinate of 136, the edge of the original can be expected in this position.

Control is returned to the explanation of the operation flow shown in FIG. 5.

In the above-mentioned steps, average values of the 3 types of elements are obtained. Furthermore, a half-power width is obtained from the spectrum in the pixel area, and the obtained half-power width is set as the frequency distribution of the pixel area (S514).

The half-power width indicates the interval of two periods near the peak period indicating the intensity of the half of the peak value in the frequency distribution chart obtained when the horizontal axis indicates a period and the vertical axis indicates the intensity of the spectrum.

Then, an average value of each element obtained in steps S508 through S512, and the frequency distribution set in step S514 are set as the feature amount of the pixel area (S516).

It is determined whether or not the above-mentioned processes are performed on all pixel areas of the framed original image A shown in FIG. 6 (S518).

If it is determined in step S518 that there is a pixel area to be scanned next, then control is passed to step S504 and the pixel area to be scanned next is set as an area to be processed, and the processes are performed in the above-mentioned steps.

Then, the processes are terminated if it is determined in step S518 that there are no subsequent pixel areas to be scanned next because the above-mentioned processes are performed on all pixel areas of the image A.

In this operation flow, four feature amounts are obtained, but feature amounts are not limited to them, and other feature amounts can be added.

Thus, the feature emphasis unit 102 shown in FIG. 1 can extract each type of feature amount in a unit of a predetermined size of pixel area from the framed original image A on which the printing area exclusion unit 100 has performed a process.

FIG. 11 shows an example of an operation flow of the provisional edge determination unit 104 shown in FIG. 1.

The operation flow is followed based on each type of feature amount extracted by the feature emphasis unit 102.

In the operation flow, the process target range of a framed original image is determined in a unit of a pixel area specified by the range 600 shown in FIG. 6 indicated by dividing the area of the framed original image A shown in FIG. 2, and the corresponding process range is set (S1100).

The determination of the process range in the present embodiment is made by defining a range from the leftmost end to the printing area 400 of the image A indicated by painting the printing area in black as shown in FIG. 4B as a process target range.

By determining the process range as described above, the upper limit line of the framed original image A shown in FIG. 6 is set as a starting line from which a pixel area is read (S1102).

The weight determining process on each feature amount described later in detail is performed (S1104).

The pixel area located at the leftmost end of the set line is set as a pixel area to be first read (S1106).

Then, On an average value for each feature amount obtained for adjacent pixel areas (in the present example, up to two pixel areas adjacent to the left of the pixel area) adjacent to the pixel area in the operation flow (steps S508 through S514) shown in FIG. 5, an average value of the two pixel areas for each feature amount is calculated (S1108).

Figure 12:
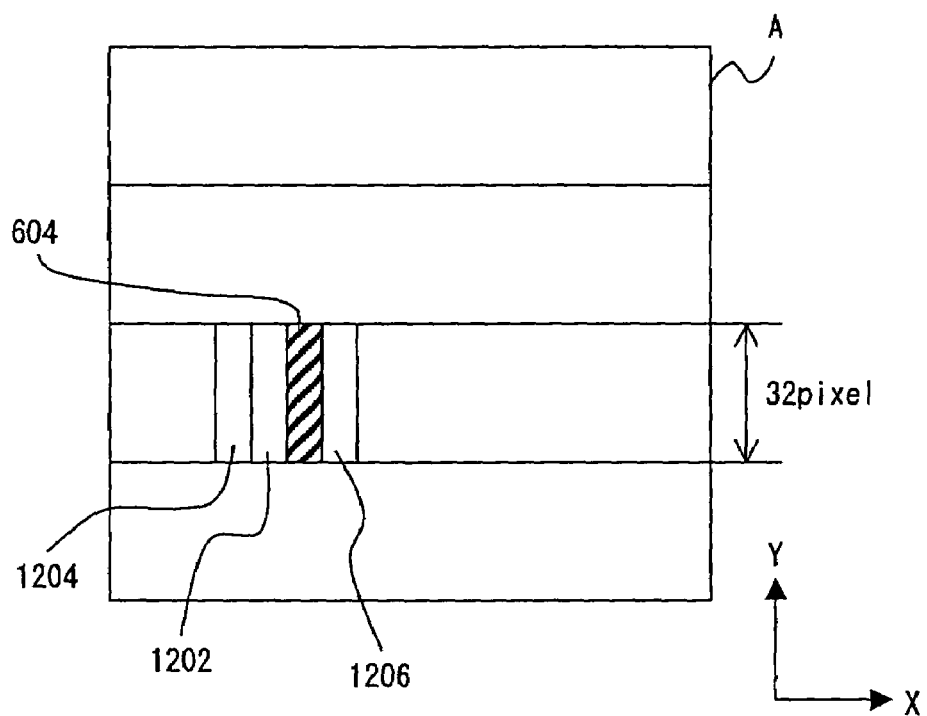
FIG. 12 shows the arrangement of pixel areas of an object whose feature amount average is to be obtained.

FIG. 12 shows the arrangement of the pixel areas to be processed for an average value in the pixel area to be processed.

FIG. 12 shows a pixel area 604 as a process target specified as a pixel area to be processed in the framed original image A shown in FIG. 6, and in this case, two pixel areas, that is, a pixel area 1202 adjacent to the left of the pixel area 604 and a pixel area 1204 further adjacent to the left, are specified as a pixel area for calculating an average value for each feature amount of the adjacent pixel area for the pixel area 604 specified to be processed.

An average value for each feature amount obtained as described above is used in the continuous processes (step S1110) shown in FIG. 11.

In step S1110 shown in FIG. 11, a variance for each feature amount between each feature amount of the pixel area to be processed and the average value of each feature amount obtained in step S1108 is obtained.

The variance of each type of feature amount obtained as described above is added to the weight of each type of feature amount obtained in the weight determining process in step S1104 or the weight (it is preferable that the high frequency element is 1, the low frequency element is 2, the direct current element is 1, and the frequency distribution is 1)) statistically obtained in advance, and the value is set as a feature variance in the pixel area (S1112).

Then, the process of obtaining the peak of feature variance set for each pixel area in step S1112 is performed (S1114).

The process (peak detecting process) of obtaining a peak value is described later in detail.

Then, a peak value is determined for feature variance of the pixel area based on the peak detecting process (S1116).

If it is determined in step S1116 that there is no peak value, then it is determined whether or not the pixel area to be scanned next (pixel area 1206 in FIG. 12) is a printing area (S1118).

If it is determined in step S1118 that the pixel area to be scanned next is not a printing area, then it is determined whether or not the pixel area (pixel area 1206 in FIG. 12) is a pixel area one pixel area next to the central pixel area in the scanning direction (S1120).

If it is determined in step S1120 that the pixel area is a pixel area one pixel area next to the central pixel area in the scanning direction, then it is determined whether or not the pixel area to be processed is located in the final line (S1122).

If it is inversely determined in the process in step S1116, then the following process is performed.

If it is determined in step S1116 that there is a peak, then it is determined that the pixel area to be processed is a pixel area corresponding to an edge, and it is provisionally determined that the pixel area is the leftmost edge of the original image (S1124). Then, control is passed to the process in step S1122.

If it is determined in step S1188 that the pixel area to be processed is a printing area, then control is passed to the process in step S1122.

If it is determined in step S1120 that the pixel area (the pixel area 1206 in FIG. 12) is not one pixel area next to the central pixel area in the scanning direction, then control is passed to the process in step S1126, and the pixel area to be scanned next is a pixel area to be processed, and the processes are repeatedly performed in the above-mentioned order from step S1108.

If it is determined in step S1122 that the pixel area to be processed is not located in the final line, then control is passed to step S1126, and the processes are performed in the above-mentioned step order.

If it is determined in step S1122 that the pixel area to be processed is located in the final line, then control is passed to the processes in step S1128.

In step S1128, the line approximation on the image plane is performed on all pixel areas corresponding to an edge detected in step S1124, and the obtained pixel on the approximate line is provisionally determined as the edge portion at the leftmost portion of the original image, thereby terminating the process.

The above-mentioned operation flow (FIG. 11) can be followed only for the color whose feature is the most clearly emphasized in the spectrum value of each of the RGB colors, and can be followed for two or more colors obtained by arbitrarily combining the RGB colors.

Figure 13:
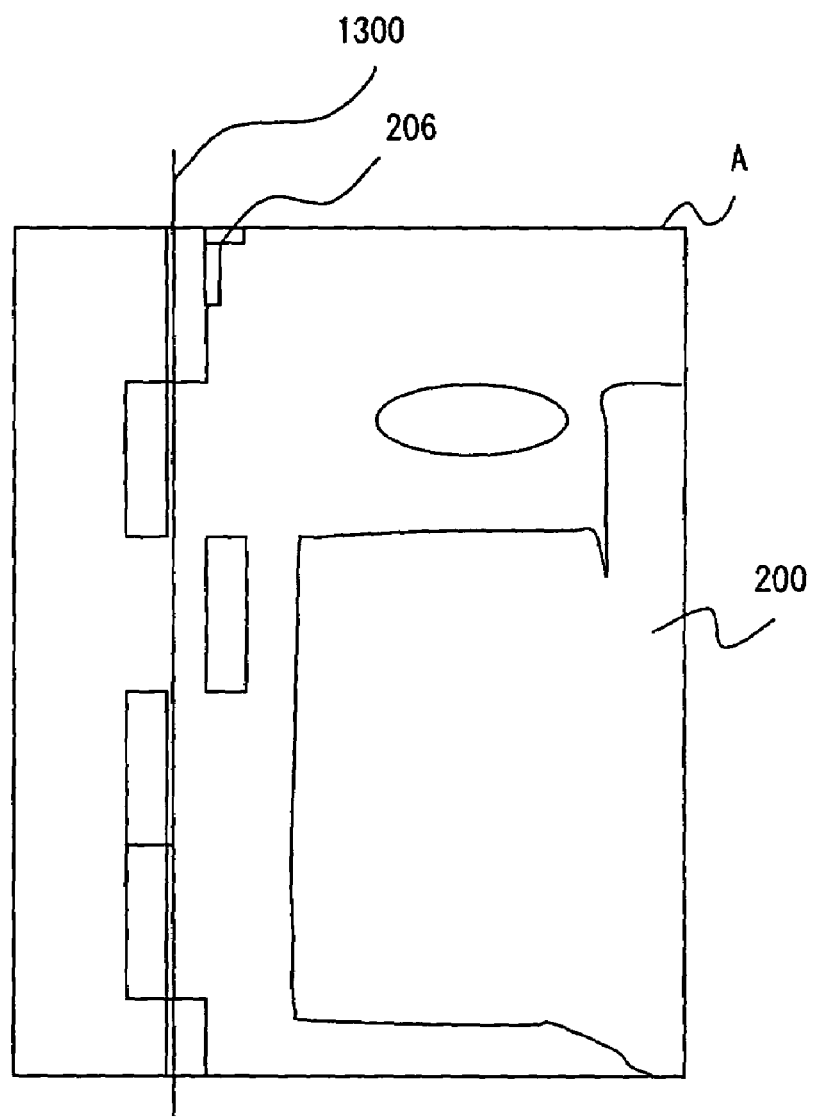
FIG. 13 shows the arrangement of a provisionally determined edge for a framed original image A.

FIG. 13 shows the arrangement of the edge provisionally determined in the above-mentioned process in reference to the framed original image A shown in FIG. 2.

A line 1300 shown for the image A in FIG. 13 is an approximate line obtained in step S1128, and the pixel corresponding to the line 1300 is provisionally determined as the leftmost edge of the original image.

In FIG. 13, the line is somewhat displaced from the actual boundary between the marginal area 202 and the background board area 204 shown in FIG. 2, but the edge of an original image can be set in the position close to the boundary.

Thus, the provisional edge determination unit 104 shown in FIG. 1 can roughly determine the position of the edge by provisionally determining the edge in the position closer to the position of the actual edge.

Sequentially described below are the weight determining process (step S1104) and the peak detecting process (step S1114) shown in FIG. 11.

Figure 14:
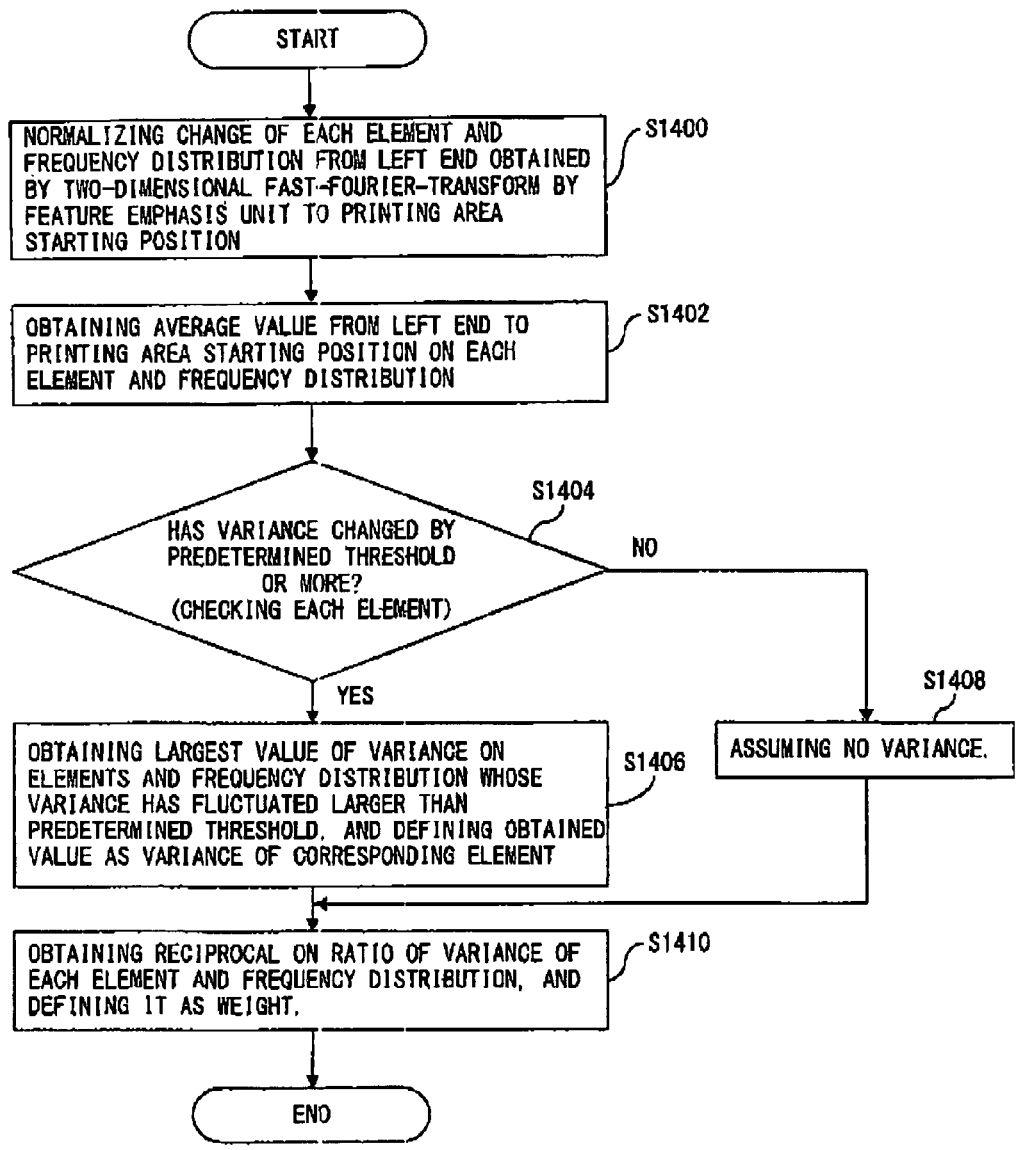
FIG. 14 shows a flow of the operations in a weight determining process.

FIG. 14 shows the operation flow of the weight determining process.

In the weight determining process, each element (the high frequency element, the low frequency element, and the direct current element) of the spectrum of each pixel area obtained in step S506 and the frequency distribution of each step shown in FIG. 5 showing the operation flow by the feature emphasis unit 102 shown in FIG. 1 are normalized by a simple average, etc. with reference to the pixel area on the left and right (S1400).

In the normalization, the error of each element of the spectrum and the frequency distribution due to small fluctuations can be absorbed.

Then, the average value of each element and frequency distribution in the process range (from the leftmost end of the framed original image to the starting position of the printing area) determined in step S1100 shown in FIG. 11 is obtained, and based on the obtained average value, the variance of each element and the frequency distribution in the above-mentioned predetermined range can be computed (S1402).

It is determined individually for each element and frequency distribution whether or not the computed variance is equal to or larger than a predetermined threshold (S1404).

The above-mentioned threshold is a value set to, for example, 0.2 times a variance average.

In step S1404, if it is determined that there is a variance value equal to or larger than a predetermined threshold, then the largest value of the variance of the element and the frequency distribution is obtained, and the value is set as the variance of the element and the frequency distribution (S1406).

If it is determined in step S1404 that the variance is not equal to or larger than the predetermined threshold, it is determined that there is no variance (S1408).

Finally, the reciprocal to the ratio of the set variance of the element and the frequency distribution is obtained, and the value is defined as the weight of the element and the frequency distribution (S1410), thereby terminating the process.

Figure 15:
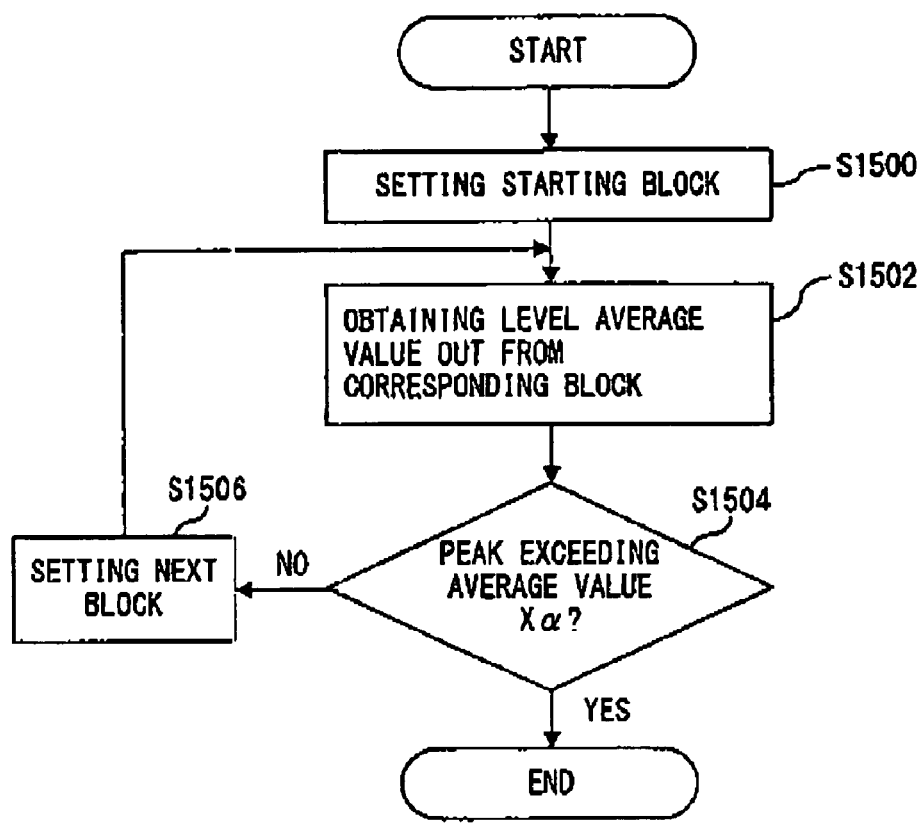
FIG. 15 shows a flow of the operations in a peak detecting process.

FIG. 15 shows the operation flow of the peak detecting process.

In the peak detecting process, a pixel area to be processed is specified (S1500).

Then, a level average value is obtained for all pixel areas opposite the scanning direction from the specified pixel area on the same line (S1502).

Figure 16:
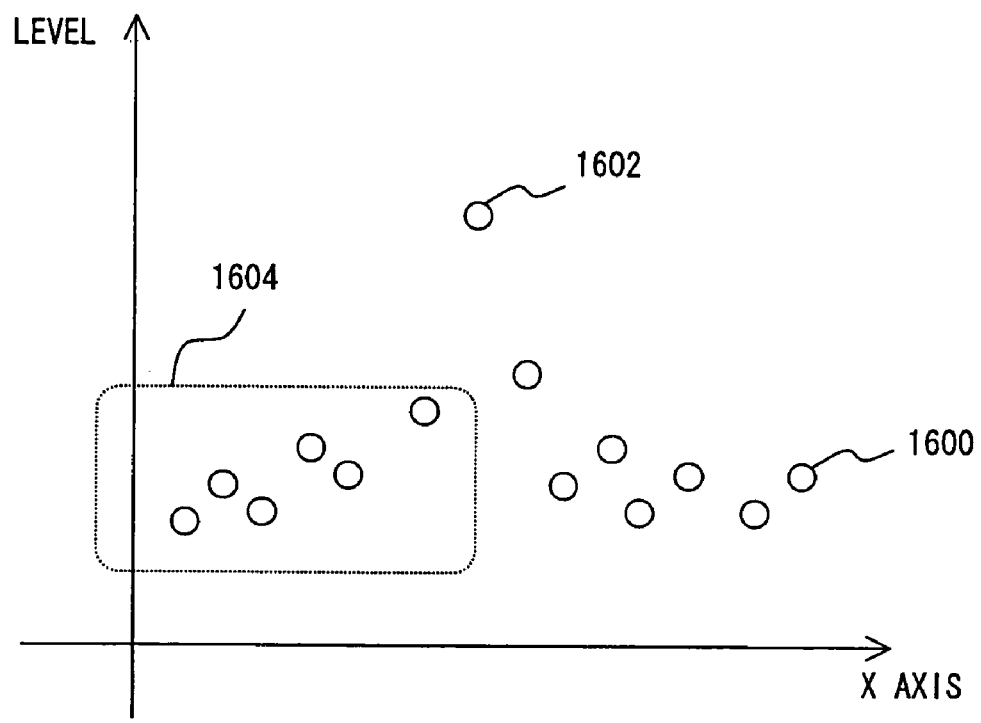
FIG. 16 shows a level distribution of a predetermined line.

FIG. 16 shows the level distribution chart of one line in which the horizontal axis indicates the x axis of the framed original image A shown in FIG. 12, and the vertical axis indicates the above-mentioned level.

White circles 1600 indicate the representative values in a unit of a predetermined pixel area.

Assuming that a white circle 1602 prominent in FIG. 16 is the level of the pixel area to be handled in the peak detecting process, the level 1604 of all pixel areas on the left are to be averaged.

The level indicated by the level average value refers to the feature variance in the provisional edge determining process shown in FIG. 11.

The peak detecting process is also used in the operation flow described below of the edge determination unit 106 shown in FIG. 1. Since the feature variance is not used in the process in step S1502, the level average value is used for convenience in explaining the peak detecting process.

When the level average value is obtained in step S1502, the peak is determined for the pixel area to be processed (S1504).

The determination is made by multiplying the above-mentioned level average value by a constant $\alpha$ computed statistically in advance (in the horizontal scanning in this example, it is the most preferable to use $\alpha=2.5$, and when various processes are performed while vertically scanning the pixel areas in a unit of a pixel area 4 pixels long×32 pixels wide, it is the most preferable to use $\alpha=2.0$), and checking whether or not the level (the feature variance in the provisional edge determining process shown in FIG. 11) of the pixel area to be processed is the peak exceeding the level average value obtained by multiplication by the above-mentioned $\alpha$.

If it is determined in step S1504 that the level to be processed is not the peak, then the pixel area to be scanned next is set again (S1506), and the processes are repeated in order from step S1502.

If it is determined that the level to be processed is the peak, then the peak detecting process terminates.

The following is an explanation of the process by the edge determination unit 106 shown in FIG. 1 that determines the correct position of the edge based on the edge provisionally determined by the provisional edge determination unit 104 shown in FIG. 1.

For easier explanation, the position of the edge provisionally determined by the provisional edge determination unit 104 shown in FIG. 1 is assumed to be indicated by the pixels arranged in the same pixel string in a unit 32 pixels long.

Figure 17:
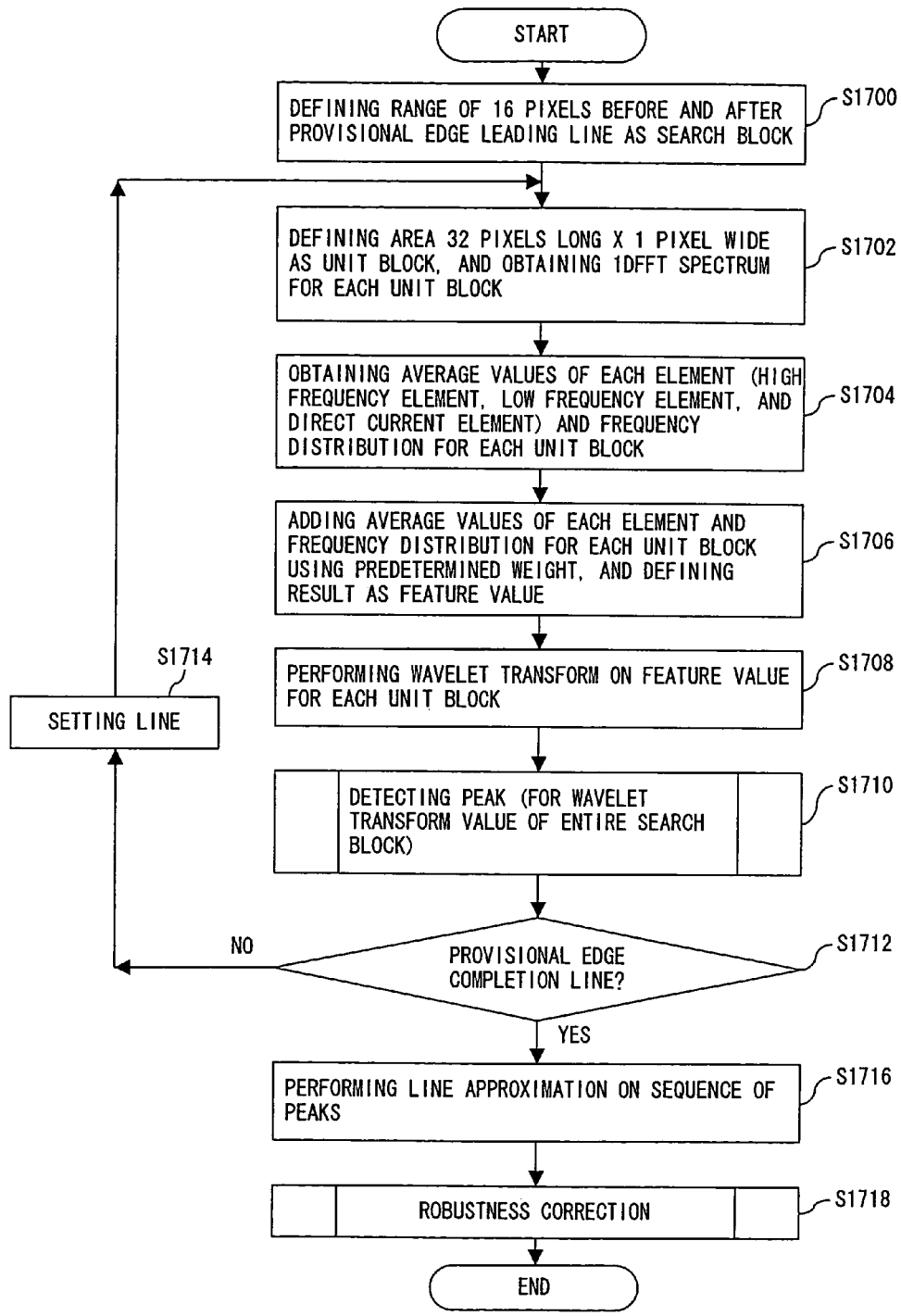
FIG. 17 shows a flow of the operations performed by an edge determination unit 106.

FIG. 17 is an operation flow of the edge determination unit 106.

In this operation flow, each of the 16-pixel ranges located before and after the pixel string (32 pixels long×1 pixel wide) provisionally set as the position of the edge of the uppermost line of the framed original image A shown in FIG. 13 in the scanning direction is set as a target of the process (S1700)

Then, the unit of the pixel area in this process is defined as the pixel string of a range of 32 pixels long×1 pixel wide, and the one-dimensional fast-Fourier-transform is performed on the above-mentioned range in the pixel string unit, thereby obtaining the spectrum of each pixel string (S1702).

Figure 18A:
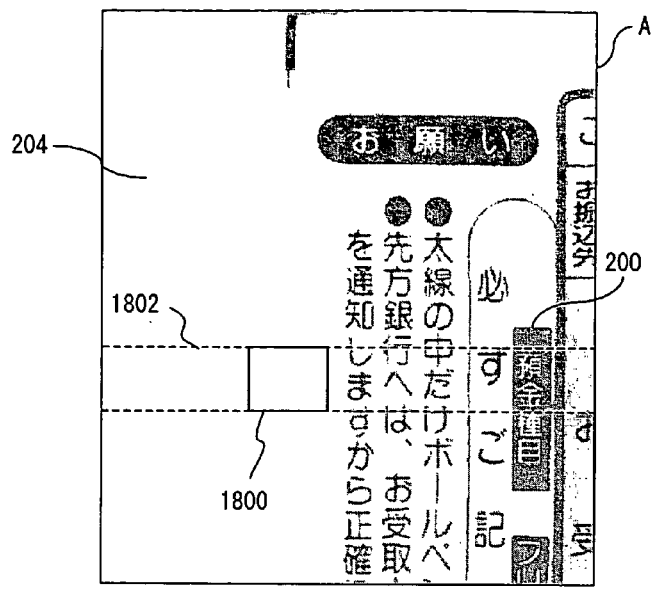
FIGS. 18A, 18B, and 18C show the range of the process performed by the edge determination unit 106 on a framed original image A.

FIG. 18A shows the range of the process target for one line.

FIG. 18A shows the range of a process target of one line including the pixel string of the approximate line 1300 shown in FIG. 13.

Although a rectangular area 1800 shown in FIG. 18A is in the range to be processed on a line 1802 indicated by broken lines, and is not shown in the attached drawings, a process target range is similarly set for the other lines.

Figure 18B:
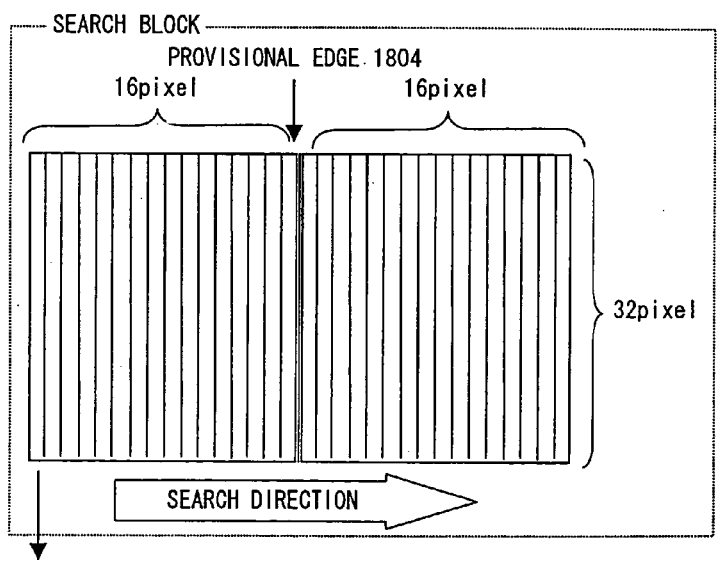

FIG. 18B is an enlarged view of the rectangular area 1800, and shows the relative position between the provisionally determined position as the position of the edge and the range to be processed.

Figure 18C:
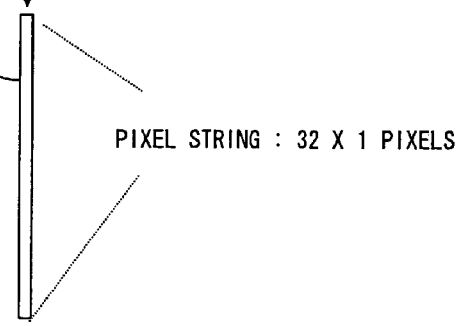

In FIG. 18B, around a provisional edge 1804 shown by the line in the center of FIG. 18B, each pixel string 1806 (32 pixels long×1 pixel wide) indicating in FIG. 18C one of the preceding and subsequent 16 pixels in the scanning direction indicated by the arrow in the horizontal direction is defined as the range of the process target.

When a spectrum is obtained in step S1702, the average value of each element of the spectrum (high frequency element, low frequency element, and direct current element) and the frequency distribution is obtained in the above-mentioned pixel string 1806 unit (S1704).

Using the weight obtained in step S1104 shown in FIG. 11 or statistically obtained in advance, the element and the frequency distribution are added up for each pixel string 1806, and the obtained value is defined as a feature value of the pixel string (S1706).

At this time, the well-known Wavelet transform is performed on the feature value (S1708).

The value obtained by the Wavelet transform is used in a line unit in the peak detecting process explained above by referring to FIGS. 15 and 16.

The peak detecting process performed in step S1710 is described below by referring to FIG. 15.

In the peak detecting process flow in step S1710, the starting pixel string of the pixel strings to be processed in the line is specified as the leftmost pixel string in the example shown in FIG. 18B (S1500).

Then, a level average value (in this example, the average value of the Wavelet transform) is obtained for all pixel strings in the same line opposite the scanning direction relative to the specified pixel string (S1502).

Based on the average value of the Wavelet transform, a peak determination is performed on the pixel string to be processed (S1504).

It is performed by multiplying the average value of the Wavelet transform by the constant α statistically computed in advance, and then it is determined whether or not the result of the Wavelet transform on the pixel string to be processed is a peak exceeding the average value of the results of the Wavelet transform multiplied by the α.

If it is determined in step S1504 that the target Wavelet transform result is not the peak, then the pixel string to be scanned next is set again, (S1506), and the processes are repeated in order from step S1502.

If it is determined that the target Wavelet transform result is the peak, then the peak detecting process terminates.

If the peak detecting process in step S1710 terminates, then it is determined whether or not the line to be processed is the final line specified as a provisional edge (S1712).

If it is not the final line, the line to be scanned next is set (S1714), and the processes are repeated from step S1702.

If it is determined in step S1712 that the line is the final line, then the line approximation is performed on the image plane on all pixel strings whose peaks have been detected in step S1710 in the manner as in the process in step S1128 shown in FIG. 11, and the pixel on the obtained approximate line is defined as the leftmost edge portion of the original image (S1716).

Then, finally, the robustness correction is performed, thereby terminating the process (S1718).

The robustness correction is performed according to the flow described below.

Figure 19:
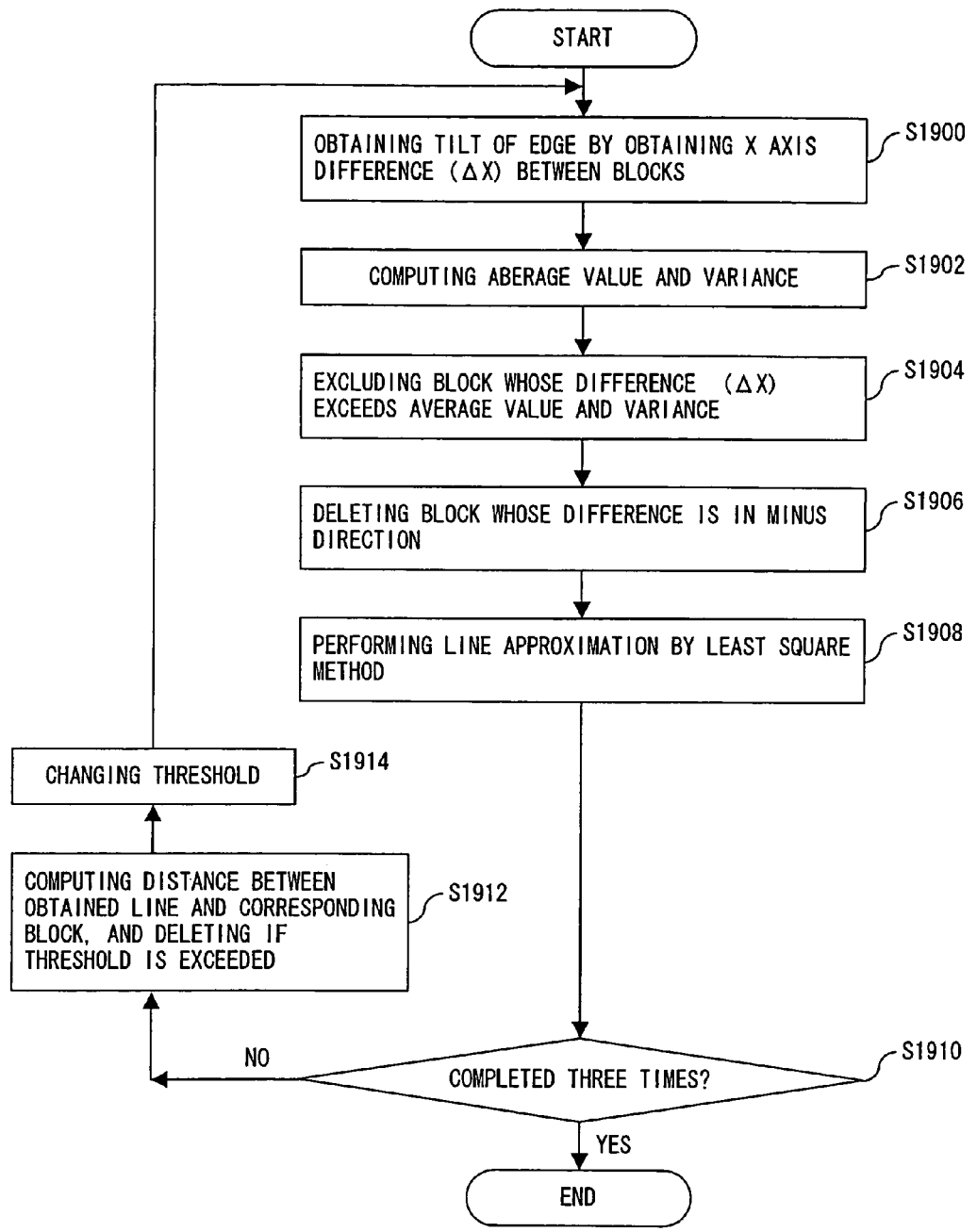
FIG. 19 shows a flow of the robustness correction processing.

FIG. 19 shows the process flow of the robustness correction.

As shown in FIG. 19, the tilt of the edge is obtained by computing the difference (Δx) in X axis on the image plane between the pixel strings determined as edges (S1900).

Then, the average value and the variance are computed for each of the obtained tilt values (S1902).

The pixel string whose difference (Δx) obtained in step S1900 exceeds the above-mentioned average value and variance is excluded (S1904).

Furthermore, the pixel string whose difference (Δx) indicates the minus direction is excluded (S1906).

Then, the line approximation in the least square method is performed (S1908).

In the next step S1910, the number of times the present processes were completed is determined. Unless the present processes have been completed three times, control is passed to step S1912, and the distance between the approximate line obtained in step S1908 and the pixel string used in the computation of the line is computed. If there is a pixel string whose value exceeds a predetermined threshold, then the pixel string exceeding the threshold is excluded (S1912).

In the subsequent process, the threshold is changed (S1914), and the processes in the above-mentioned steps are sequentially performed.

If it is finally determined in step S1910 that the present process has been performed three times, the pixel on the latest approximate line obtained so far is finally determined as the leftmost edge portion of the original image, thereby terminating all processes.

The above-mentioned operation flow (FIG. 17) can be performed only on the color whose feature is the most clearly indicated in the spectrum values of the RGB colors, or can be performed on two or more colors obtained by arbitrarily combining the RGB colors.

Thus, the edge determination unit 106 shown in FIG. 1 is to perform the edge designating process only on the edge position provisionally obtained by the provisional edge determination unit 104 shown in FIG. 1 and the vicinal range.

Since only the vicinity of the portion predicted as an edge can be processed as a process target, an edge position can be more correctly detected in a target area with little noise with a narrow range of other image area containing no edges although the Wavelet transform sensitive to noise (other image information) in an image area having nothing to do with an edge is applied.

All the above-mentioned processes are performed on the leftmost edges of originals for comprehensibility of the explanation, but each of the other edges (the uppermost edge, the rightmost edge, or the lowermost edge of an original) can be determined by scanning in the opposite direction from each point, and the process results can be integrated so that all edges around an original, the size of an original, etc. can be determined.

FIG. 20 shows an example of the entire process flow of designating the edges around the original by detecting the four edges (the leftmost edge, the rightmost edge, the uppermost edge, and the lowermost edge).

Each process is shown on the left of FIG. 20, and the process image of the framed original image (indicated as a shaded original area) corresponding to each of the processes is shown on the right of FIG. 20.

In this process, it is assumed that the printing area contained in the framed original image A is excluded by performing a character area excluding process, and the vertical edge is first detected, and then the horizontal edge is detected.

First, to detect a vertical edge, a feature amount (for example, the image frequency (or the spectrum), the frequency distribution, etc. contained in the area) is extracted from the framed original image A in a unit of line 32 pixels long as shown by the horizontal line in the framed original image for each pixel area 32 pixels long×4 pixels wide in this example (S2000).

Then, based on the scanning from the leftmost side of FIG. 20 to the right for detecting the left edge, the position corresponding to the leftmost edge is provisionally determined from the extracted feature amount, the feature amounts in the provisionally determined position of the leftmost edge and the vicinity (pixel area adjacent to the pixel area) are extracted, and the edge position detected based on the feature amount is determined as the position of the leftmost edge (S2002).

Then, based on the scanning from the right side of FIG. 20 to the left for detecting the right edge, the position corresponding to the rightmost edge is provisionally determined from the extracted feature amount, the feature amounts in the provisionally determined position of the rightmost edge and the vicinity (pixel area adjacent to the pixel area) are extracted, and the edge position detected based on the feature amount is determined as the position of the rightmost edge (S2004).

Then, a horizontal edge is detected.

First, to detect a horizontal edge, a feature amount (for example, the image frequency (or the spectrum), the frequency distribution, etc. contained in the area) is extracted from the framed original image A in a unit of line 32 pixels wide as shown by the vertical line in the framed original image for each pixel area 4 pixels long×32 pixels wide in this example (S2006).

Then, based on the scanning from the uppermost side of FIG. 20 to the lowermost for detecting the uppermost edge, the position corresponding to the uppermost edge is provisionally determined from the extracted feature amount, the feature amounts in the provisionally determined position of the uppermost edge and the vicinity (pixel area adjacent to the pixel area) are extracted, and the edge position detected based on the feature amount is determined as the position of the uppermost edge (S2008).

Then, based on the scanning from the lowermost side of FIG. 20 to the uppermost for detecting the lowermost edge, the position corresponding to the lowermost edge is provisionally determined from the extracted feature amount, the feature amounts in the provisionally determined position of the lowermost edge and the vicinity are extracted, and the edge position detected based on the feature amount is determined as the position of the lowermost edge (S2010).

When the vertical scanning is performed to detect the uppermost edge or the lowermost edge, it is desired that the pixel settings on the above-mentioned line and the range of a pixel area with the vertical and horizontal pixel settings in the horizontal scanning exchanged.

Thus, by performing the processes in the four directions, the four edges of the original can be designated.

In the above-mentioned explanation, it is assumed that the original has a surrounding marginal area, and the color of the background board is as white as the marginal area. However, the present invention is not limited to this application, and any other color can be applied.

Furthermore, for convenience, in the explanation above, the portion other than the marginal area of the original is occupied by a printing area filled with characters and ruled lined. However, the above-mentioned character area excluding process can be omitted for an original including no printing areas.

Each function contained in the operation flow is stored in the memory such as RAM (random access memory) and ROM (read only memory), etc. configured in the image processing device as a program code readable by the CPU (central processing unit), and is realized by the CPU connected to the memory through a bus.

An example in which the above-mentioned image processing device is configured is a copying machine.

Figure 21:
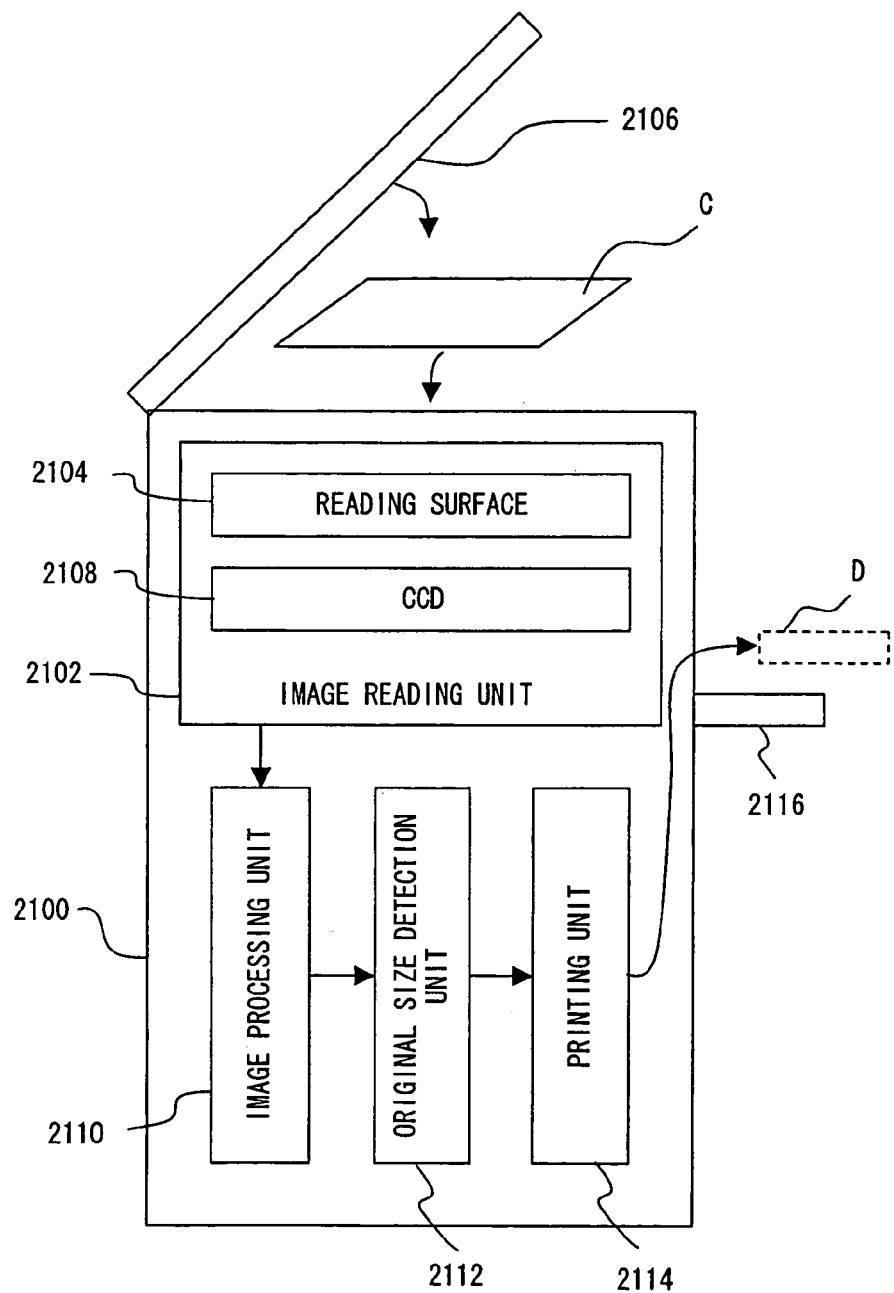
FIG. 21 is a block diagram of a copying machine.

FIG. 21 is a block diagram of a copying machine.

A copying machine 2100 shown in FIG. 21 sets the surface (read target surface) of the original C on the reading surface 2104 formed on a image reading unit 2102, and an image can be read with an original cover 2106 covering the original from the back of the original.

The image reading unit 2102 reads an image by emitting a light from a reading surface 2104, an optical reader device 2108 (CCD) configured in the image reading unit reads the reflected light line by line, converts the read information about the surface of the original into an electric signal, and transmits the converted image information to an image processing unit 2110 for performing the above-mentioned edge detecting process.

Since the image processing unit 2110 can detect the boundary between the background image and the margin of the original of the same color as described above, a copy of the original C of a designated original size can be printed from a printing unit 2114 to a discharge table 2116 of a copying machine by transmitting the edge information obtained by the detecting process to an original size detection unit 2112, and designating the size of the original.

FIG. 22 shows an example of the hardware for the above-mentioned image processing technology.

In FIG. 22, a scanner 2200 and a personal computer (PC) 2202 for image processing are connected through a cable 2204.

With the above-mentioned configuration, memory such as RAM (random access memory), ROM (read only memory), etc. in the PC 2202, but not shown in the attached drawings stores the above-mentioned program, and the CPU connected to the memory through a bus executes the program, thereby extracting original edge information from the image data read by the scanner 2200 and transmitted to the PC 2202 through the cable 2204.

Figure 23:
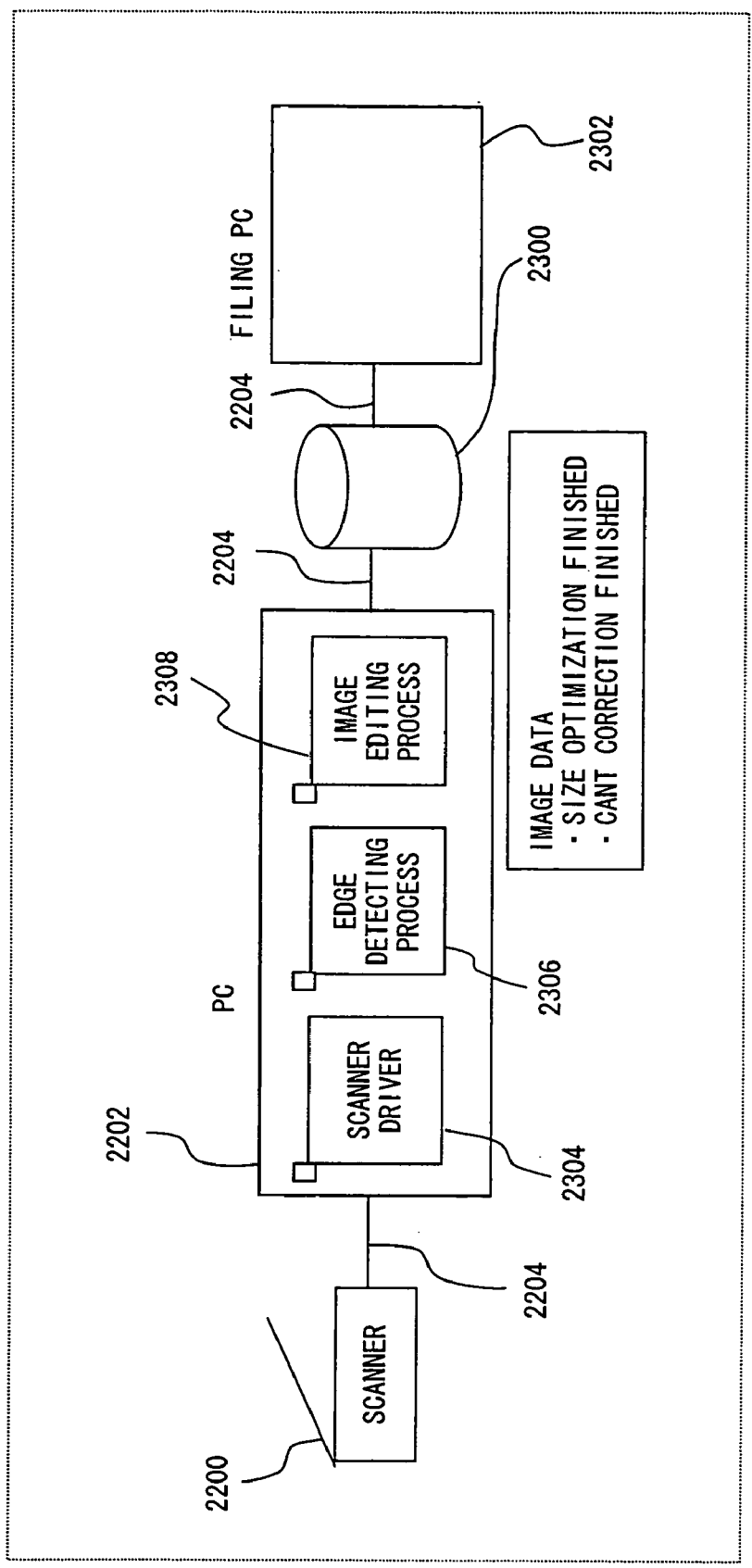
FIG. 23 shows an example (2) of the hardware for which the image processing technology is used.

FIG. 23 shows an example of the hardware for the above-mentioned image processing technology.

In FIG. 23, in addition to the scanner 2200 and the personal computer (PC) 2202, an image data accumulation unit 2300 for accumulating edited image data and a filing PC are connected through the cable 2204, thus forming an image filing system.

With the configuration, the image data read by the scanner 2200 by driving a scanner driver 2304 of the PC 2202 is fetched to the PC 2202, an original edge detecting process 2306 of the edge of an original is performed on the fetched image data, the background board image is segmented based on the obtained edge information to optimize the image size, and an image editing process 2308 is performed by rotating data according to the obtained information to correct the cant, thereby accumulating the edited image data in the image data accumulation unit 2300.

At this time, the filing PC 2302 is allowed to manage the image data with the relevant information about the image data accumulated in the image data accumulation unit 2300 associated with the management table not shown in the attached drawings of the filing PC 2302 for each piece of image data.

Figure 24:
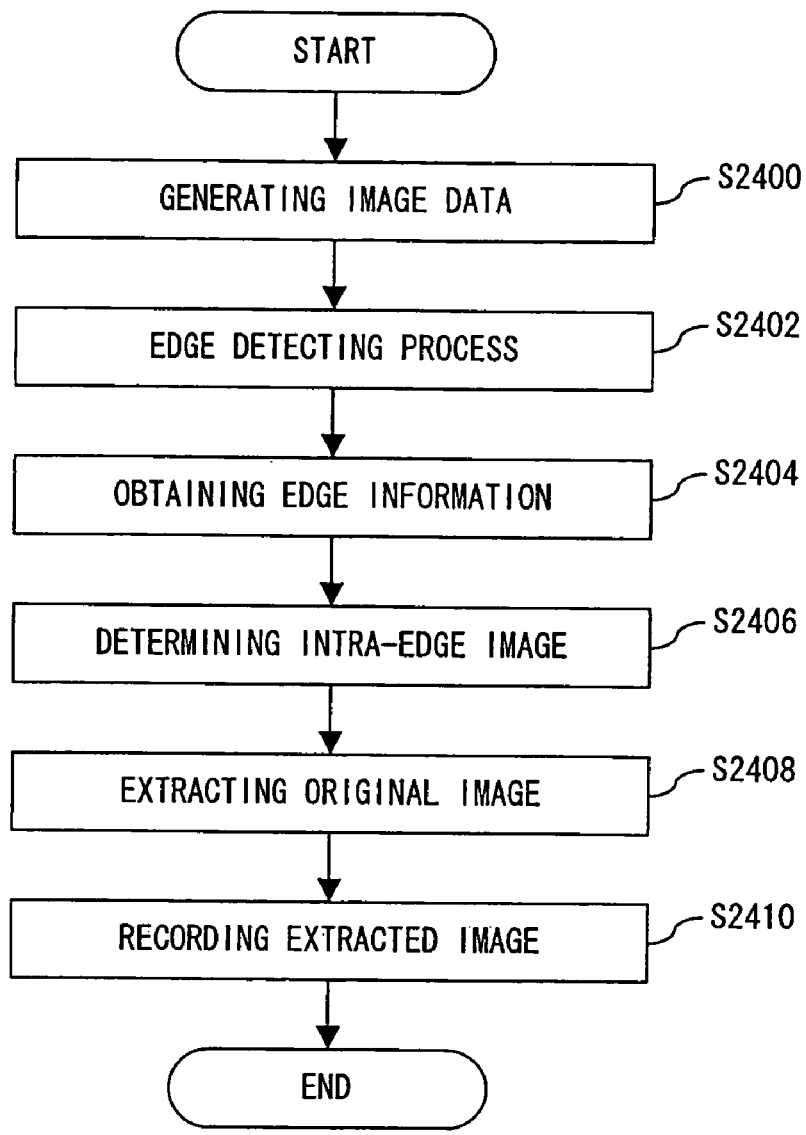
FIG. 24 shows an example (1) of a flow of the operations in the hardware shown in FIG. 23.

FIG. 24 shows an example of an operation flow with the configuration of the hardware shown in FIG. 23.

First, the image data read through the scanner 2200 by driving the scanner driver 2304 is fetched into the PC 2202 (S2400).

Then, the edge detecting process explained above in detail is performed on the image data (S2402), as the result, the edge information about the original is obtained (S2404).

It is determined whether or not it is an image area surrounded by four edges in editing the image data (S2406), and only the image area (original image) surrounded by four edges is extracted (S2408).

Then, the optimized original image is recorded in the image data accumulation unit 2300 (S2410).

Figure 25:
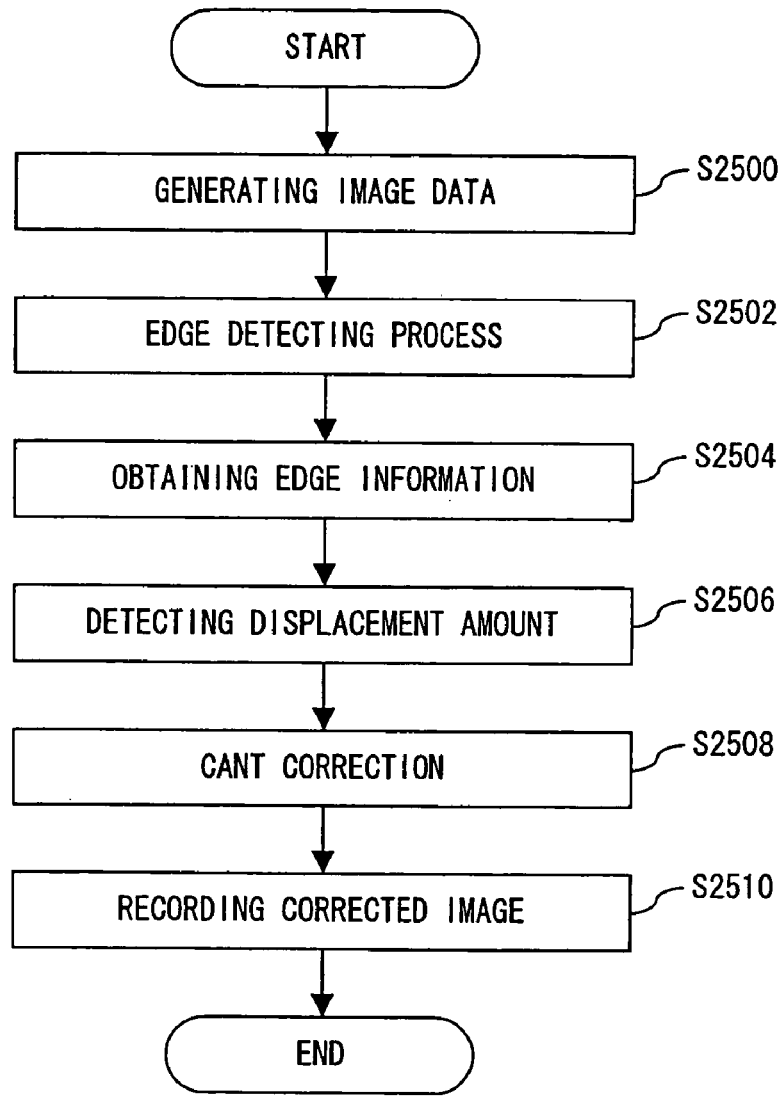
FIG. 25 shows an example (2) of a flow of the operations in the hardware shown in FIG. 23.

FIG. 25 shows an example of an operation flow with the configuration of the hardware shown in FIG. 23.

First, the scanner driver 2304 is driven to fetch the image data read from the printing area 200 into the PC 2202 (S2500).

Then, the edge detecting process explained above in detail is performed on the image data (S2502), as a result, the edge information about the original is obtained (S2504).

Then, for example, the smallest tilt of the obtained edge relative to the axis (X axis or Y axis) on the image plane is detected in editing the image data (S2506), and the image data is rotated such that the tilt can be removed by correcting the cant (S2508).

Thus, the corrected image original is recorded in the image data accumulation unit 2300 (S2510).

It is also possible to combine the operation flows shown in FIGS. 24 and 25. For example, the processes in steps S2506 and S2508 can be performed between the processes in steps S2404 and S2406 shown in FIG. 24.

Thus, the post-processing can be easily performed by correcting the cant.

Additionally, redundant data can be removed by deleting the background image data, and a smaller amount of data is required, thereby requiring a smaller amount of data storage in performing a process at a higher speed.

Figure 26:
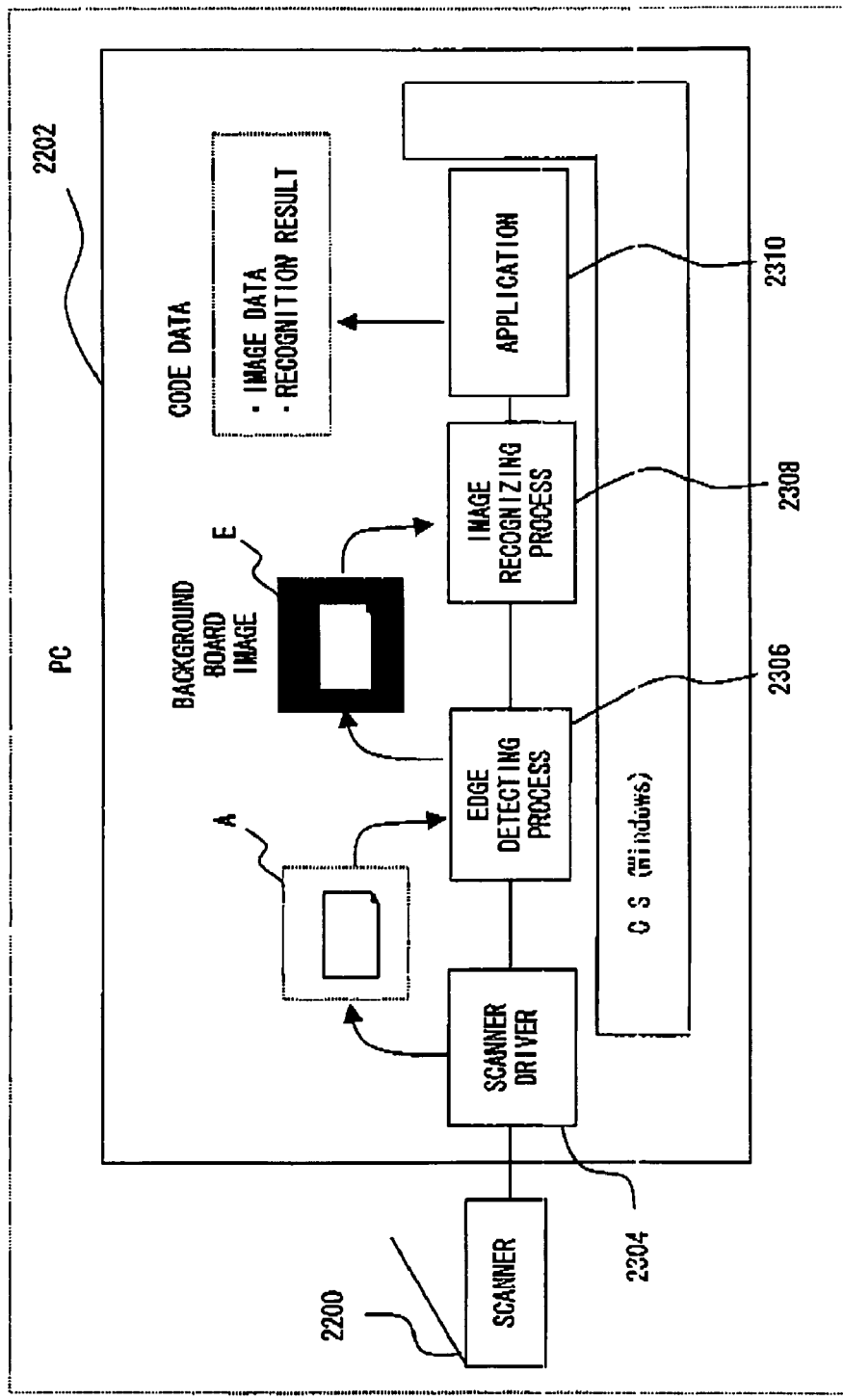
FIG. 26 shows an example of an application of the image processing technology according to the present invention.

FIG. 26 shows an example of extending the process performed by the PC 2202 with the above-mentioned two configurations.

In FIG. 26, the process is performed by the PC 2202 having the Windows (registered trademark) environment under which the framed original image A is read from the scanner 2200 by driving the scanner driver 2304, and fetched to the PC 2202, the original edge detecting process 2306 is performed on the image A, a black background board image E is generated with the background board image outside the obtained edge colored in black based on the obtained edge information, the result of the image recognizing process 2308 performed on the image E is transmitted to an application 2310, and character-recognized information (code data, etc.) can be retrieved from the application 2310.

FIG. 27 is a flowchart of generating the above-mentioned black background board image E.

First, the image data A read through the scanner 2200 by driving the scanner driver 2304 is fetched to the PC 2202 (S2700).

Then, the edge detecting process explained above in detail is performed on the image data (S2702), as the result, the edge information about the original is obtained (S2704).

An image area other than the image area surrounded by four edges is determined on the image data (S2706), and the image area other than the image area (original image) surrounded by the four edges is changed such that its gray scale level indicates black (S2708).

Finally, the starting point (for example, the position of the upper left corner of the original image on the image plane) of the original image is designated, and a character recognizing process is performed by, for example, segmenting an image from the printing position on predetermined position from the starting point and analyzing the image, extracting the character contained in the image based on the pattern recognizing process, etc. (S2710)

The flow of the present process can also be combined with the operation flow shown in FIG. 25. For example, the processes in steps S2506 and S2508 can be performed between the processes in steps S2704 and S2706 shown in FIG. 27.

Thus, since image data of the same specification as the conventional image having a black background board image around the edges of the original image fetched through the conventional scanner of the black background board can be generated by coloring the background board image in black, the device (for example, OCR processing unit) for editing the image data having the conventional black background can be allowed to use the image data obtained by the image processing device of the present invention.

Each of the above-mentioned processes (obviously including the edge detecting process) can be distributed as a program.

In this case, the above-mentioned program can be distributed after being recorded on the record medium such as a floppy disk (registered trademark), CD-ROM, a DVD, etc. (for example, the CD-ROM inserted to a CD-ROM insertion unit 2206 shown in FIG. 22), or all or a part of the program can be distributed through a transmission medium used in a public network, etc.

The user who obtains the above-mentioned distributed program allows the program to be read to the memory such as RAM, ROM, etc. connected through a bus using a reading unit for reading information recorded in the record medium in the data processing device such as a computer, etc. and a communications unit, etc. for communicating data with foreign equipment, and to be extracted by the CPU (central processing unit) connected to the memory through a bus, thereby realizing the above-mentioned image processing in the data processing device of the user.

As described above, according to the embodiment of the present invention, since the process target is roughly predicted with the printing area first excluded, the subsequent process can be performed at a high speed.

Furthermore, since the variance in feature information from the adjacent area corresponding to the printing area can be ignored, the boundary between the background board and the original can be easily designated.

Additionally, according to the embodiment of the present invention, the unit area of an image can be set a little widely, the boundary position between the background board on the image and the original can be provisionally determined based on the feature amount obtained in the two-dimensional fast-Fourier-transform (2DFFT), the one-dimensional fast-Fourier-transform (1DFFT) is performed in a unit of an area smaller than the above-mentioned unit area, and then a Wavelet transform is performed, thereby performing the process up to detecting the boundary at a high speed, and detecting with precision the position of the boundary.

Furthermore, since the above-mentioned image processing can be performed by freely combining the materials of the background board and the original, the present invention can be applied to any original image read from a scanner of any type of background board.

As described above, according to the embodiment of the present invention, the edge of an original can be detected from the image data read from any combination of an original and a background board.

Additionally, the OCR processing can be performed maintaining the advantage of the reading device for reading a white background, that is, the feature of strong contrast, the feature of successfully reading data on thin paper, and the feature of no back copy.

The present invention can be embodied in any of the above-mentioned combinations of embodiments and in various aspects without departure from the spirit and main features of the present invention. Therefore, the above-mentioned embodiments are only examples of the present invention, but the present invention is not limited to them. The scope of the present invention is described in the claims for the patent, and is not restricted by the body of the specifications. Furthermore, any variations and changes belonging to the scope of the claims for the patent are included in the scope of the present invention.

What is claimed is:

1. A boundary detection method comprising:
extracting feature information depending on all pixels in a unit area for each unit area of an image data;
obtaining a difference in the feature information between adjacent unit areas for an arbitrary unit area; and
determining as a boundary the unit area whose difference is at or higher than a predetermined level, wherein
the input image data of an original whose front image is input with a background board as its background,
the boundary between areas having different features among arbitrary adjacent areas in the image data is detected,
a target is roughly predicted with a printing area first excluded, and a variance in feature information from the adjacent area corresponding to the printing area can be ignored, then the boundary between the background board and the original is detected, and
if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

2. A boundary detection method comprising:
extracting image frequency information for each unit area of an image data;
determining representative feature information according to the extracted image frequency information;
obtaining a difference in the representative feature information between adjacent unit areas for an arbitrary unit area; and
determining as the boundary the unit area whose difference is at or higher than a predetermined level, wherein
the input image data of an original whose front image is input with a background board as its background,
the boundary between areas having different pixel arrangements among arbitrary adjacent areas in the image data is detected,
a target is roughly predicted with a printing area first excluded, and a variance in feature information from the adjacent area corresponding to the printing area can be ignored, then the boundary between the background board and the original is detected, and
if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a wavelet transform is performed for detecting the position of the boundary.

3. A boundary detection method comprising:
extracting first image frequency information of predetermined types for each first unit area of an image data;
defining a value obtained by adding a predetermined weight to each type of the extracted first image frequency information as representative feature information;
provisionally determining as a boundary a first unit area whose variance from the representative feature information of an adjacent first unit area is at or higher than a predetermined level in an arbitrary first unit area;
extracting second image frequency information for each second unit area smaller than the first unit area in the first unit area provisionally determined as the boundary and a vicinal area of the first unit area; and
determining as the boundary a second unit area whose value based on the variance from the second image frequency information of the adjacent second unit area is at or higher than a predetermined level in an arbitrary second unit area, wherein
the input image data of an original whose front image is input with a background board as its background,
the boundary between areas having different pixel arrangements among arbitrary adjacent areas in the image data is detected, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

4. A boundary detection method comprising:

performing a Fourier-transform on each first unit area of an input image data;

extracting first image frequency information of predetermined types obtained by the Fourier-transform processing;

defining a value obtained by adding a predetermined weight to each type of the extracted first image frequency information as representative feature information for each of the first unit area;

provisionally determining as a boundary a corresponding area on an approximate line obtained by performing line approximation on a first unit area whose variance from the representative feature information about an adjacent first unit area is at or higher than a predetermined level in an arbitrary first unit area;

performing a Fourier-transform on each second unit area smaller than the first unit area in the first unit area provisionally determined as the boundary and a vicinal area of the first unit area;

extracting second image frequency information of predetermined types obtained by the Fourier-transform;

defining as representative feature information a value obtained by adding a predetermined weight to each type of the extracted second image frequency information for each second unit area;

performing a Wavelet transform on the representative feature information;

performing line approximation on a second unit area whose value for each second unit area obtained by the Wavelet transform is at or higher than a predetermined level; and determining a position on the approximate line obtained by the line approximation as the boundary, wherein the input image data of an original whose front image is input with a background board as its background, the boundary between a background board and an original for the input image data of an image of a part of the background board and an edge of the original input in a same color is detected, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

5. The method according to claim 4, wherein in image data in which the original is surrounded by the background board, the boundary is detected from four different directions parallel or orthogonal to each other on the image data.

6. The method according to claim 1, wherein a printing area is first designated for the image data, and image data from which the printing area is excluded is defined as a target for detecting the boundary.

7. The method according to claim 2, wherein a printing area is first designated for the image data, and image data from which the printing area is excluded is defined as a target for detecting the boundary.

8. The method according to claim 3, wherein a printing area is first designated for the image data, and image data from which the printing area is excluded is defined as a target for detecting the boundary.

9. The method according to claim 4, wherein a printing area is first designated for the input image data, and input image data from which the printing area is excluded is defined as a target for detecting the boundary.

10. The method according to claim 1, wherein said feature information comprises a high frequency element, a low frequency element, a direct current element, and a frequency distribution.

11. The method according to claim 5, wherein when the determined boundary forms a rectangle, cant correction is performed on an area contained in the rectangle based on the boundary.

12. The method according to claim 5, wherein based on the determined boundary, one area adjacent to the boundary or an original portion of the image data is left, and the other area or a background board of the image data is removed.

13. The method according to claim 11, wherein based on the determined boundary, one area adjacent to the boundary or an original portion of the image data is left, and the other area or a background board of the image data is removed.

14. The method according to claim 5, wherein:

based on the determined boundary, one area adjacent to the boundary or a background board portion of the image data is colored in black; and a character contained in the other area adjacent to the boundary than the area colored in black is recognized.

15. The method according to claim 11, wherein:

based on the determined boundary, one area adjacent to the boundary or a background board portion of the image data is colored in black; and a character contained in an area adjacent to the boundary other than the area colored in black is recognized.

16. A computer-readable handy storage medium storing a program used to direct a computer to perform a process, comprising the functions of:

extracting feature information depending on all pixels in a unit area for each unit area of an image data;

obtaining a difference in the feature information between adjacent unit areas for an arbitrary unit area; and determining as the boundary the unit area whose difference is at or higher than a predetermined level, wherein the input image data of an original whose front image is input with a background board as its background, the boundary between areas having different features among arbitrary adjacent areas in the image data is detected, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a wavelet transform is performed for detecting the position of the boundary.

17. A computer-readable handy storage medium storing a program used to direct a computer to perform a process, comprising the functions of:

extracting image frequency information for each unit area of a image data;

determining representative feature information according to the extracted image frequency information;

obtaining a difference in the representative feature information between adjacent unit areas for an arbitrary unit area; and determining as a boundary the unit area whose difference is at or higher than a predetermined level, wherein the input image data of an original whose front image is input with a background board as its background, the boundary between areas having different pixel arrangements among arbitrary adjacent areas in the image data is detected, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a wavelet transform is performed for detecting the position of the boundary.

18. A computer-readable handy storage medium storing a program used to direct a computer to perform a process, comprising the functions of:

extracting first image frequency information of predetermined types for each first unit area of an image data;

defining a value obtained by adding a predetermined weight to each type of the extracted first image frequency information as representative feature information;

provisionally determining as a boundary a first unit area whose variance from the representative feature information of an adjacent first unit area is at or higher than a predetermined level in an arbitrary first unit area;

extracting second image frequency information for each second unit area smaller than the first unit area in the first unit area provisionally determined as the boundary and a vicinal area of the first unit area; and determining as the boundary a second unit area whose value based on the variance from the second image frequency information of the adjacent second unit area is at or higher than a predetermined level in an arbitrary second unit area, wherein the input image data of an original whose front image is input with a background board as its background, the boundary between areas having different pixel arrangements among arbitrary adjacent areas in the image data is detected, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

19. A computer-readable handy storage medium storing a program used to direct a computer to perform a process; comprising the functions of:

performing a Fourier-transform on each first unit area of an input image data;

extracting first image frequency information of predetermined types obtained by the Fourier-transform processing;

defining a value obtained by adding a predetermined weight to each type of the extracted first image frequency information as representative feature information for each of the first unit areas;

provisionally determining as a boundary a corresponding area on an approximate line obtained by performing line approximation on a first unit area whose variance from the representative feature information about an adjacent first unit area is at or higher than a predetermined level in an arbitrary first unit area;

performing a Fourier-transform on each second unit area smaller than the first unit area in the first unit area provisionally determined as the boundary and a vicinal area of the first unit area;

extracting second image frequency information of predetermined types obtained by the Fourier-transform;

defining as representative feature information a value obtained by adding a predetermined weight to each type of the extracted second image frequency information for each second unit area;

performing a Wavelet transform on the representative feature information;

performing line approximation on a second unit area whose value for each second unit area obtained by the Wavelet transform is at or higher than a predetermined level; and determining a position on the approximate line obtained by the line approximation as the boundary, wherein the input image data of an original whose front image is input with a background board as its background, the boundary between a background board and an original for the input image data of an image of a part of the background board and an edge of the original input in a same color is detected, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fouriertransform, a one-dimensional fast-Fourier-transform is performed in a unit of an area smaller than the unit area of the image, and then a Wavelet transform is performed for detecting the position of the boundary.

20. The storage medium according to claim 19, wherein said program further directs the computer to realize the function of detecting, in image data in which the original is surrounded by the background board, the boundary from four different directions parallel or orthogonal to each other on the image data.

21. The storage medium according to claim 16, wherein said program further directs the computer to realize the function of first designating a printing area for the image data, and defining image data from which the printing area is excluded as a target for detecting the boundary.

22. The storage medium according to claim 17, wherein said program further directs the computer to realize the function of first designating a printing area for the image data, and defining image data from which the printing area is excluded as a target for detecting the boundary.

23. The storage medium according to claim 18, wherein said program further directs the computer to realize the function of first designating a printing area for the image data, and defining image data from which the printing area is excluded as a target for detecting the boundary.

24. The storage medium according to claim 19, wherein said program further directs the computer to realize the function of first designating a printing area for the input image data, and defining input image data from which the printing area is excluded as a target for detecting the boundary.

25. The storage medium according to claim 16, wherein said feature information comprises a high frequency element, a low frequency element, a direct current element, and a frequency distribution.

26. The storage medium according to claim 20, wherein said program further directs the computer to perform cant correction on an area contained in the rectangle based on the boundary when the determined boundary forms a rectangle.

27. The storage medium according to claim 19, wherein said program further directs the computer to leave one area adjacent to the boundary or an original portion of the image data, and remove the other area or a background board of the image data based on the determined boundary.

28. The storage medium according to claim 19, wherein said program further directs the computer to perform the functions of:
coloring one area adjacent to the boundary or a background board portion of the image data in black based on the determined boundary; and
recognizing a character contained in an area adjacent to the boundary other than the area colored in black.

29. An image processing device comprising:
a feature emphasis unit extracting feature information depending on all pixels in a unit area for each unit area of an image data; and
a boundary determination unit obtaining a difference in the feature information between adjacent unit areas for an arbitrary unit area, and determining as the boundary the unit area whose difference is at or higher than a predetermined level, wherein
the input image data of an original whose front image is input with a background board as its background,
the boundary between areas having different features among arbitrary adjacent areas in the image data is detected,
a target is roughly predicted with a printing area first excluded, and a variance in feature information from the adjacent area corresponding to the printing area can be ignored, then the boundary between the background board and the original is detected, and
if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

30. An image processing device comprising:
a feature emphasis unit extracting image frequency information for each unit area of a image data; and
a boundary determination unit determining representative feature information according to the extracted image frequency information, obtaining a difference in the representative feature information between adjacent unit areas for an arbitrary unit area, and determining as a boundary the unit area whose difference is at or higher than a predetermined level, wherein
the input image data of an original whose front image is input with a background board as its background,
the boundary between areas having different pixel arrangements among arbitrary adjacent areas in the image data is detected,
a target is roughly predicted with a printing area first excluded, and a variance in feature information from the adjacent area corresponding to the printing area can be ignored, then the boundary between the background board and the original is detected, and
if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

31. An image processing device comprising:
a feature emphasis unit extracting first image frequency information of predetermined types for each first unit area of an image data;
a boundary provisional determination unit defining a value obtained by adding a predetermined weight to each type of the extracted first image frequency information as representative feature information, and provisionally determining as a boundary a first unit area whose variance from the representative feature information of an adjacent first unit area is at or higher than a predetermined level in an arbitrary first unit area; and
a boundary determination unit extracting second image frequency information for each second unit area smaller than the first unit area in the first unit area provisionally determined as the boundary and a vicinal area of the first unit area, and determining as the boundary a second unit area whose value based on the variance from the second image frequency information of the adjacent second unit area is at or higher than a predetermined level in an arbitrary second unit area, wherein
the input image data of an original whose front image is input with a background board as its background, the boundary between areas having different pixel arrangements among arbitrary adjacent areas in the image data is detected, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

32. An image processing device comprising:

a feature emphasis unit performing a Fourier-transform on each first unit area of an input image data, and extracting first image frequency information of predetermined types obtained by the Fourier-transform processing;

a boundary provisional determination unit defining a value obtained by adding a predetermined weight to each type of the extracted first image frequency information as representative feature information for each of the first unit area, and provisionally determining as a boundary a corresponding area on an approximate line obtained by performing line approximation on a first unit area whose variance from the representative feature information about an adjacent first unit area is at or higher than a predetermined level in an arbitrary first unit area; and a boundary determination unit performing a Fourier-transform on each second unit area smaller than the first unit area in the first unit area provisionally determined as the boundary and a vicinal area of the first unit area, extracting second image frequency information of predetermined types obtained by the Fourier-transform, defining as representative feature information a value obtained by adding a predetermined weight to each type of the extracted second image frequency information for each second unit area, performing a Wavelet transform on the representative feature information, performing line approximation on a second unit area whose value for each second unit area obtained by the Wavelet transform is at or higher than a predetermined level, and determining a position on the approximate line obtained by the line approximation as the boundary, wherein the input image data of an original whose front image is input with a background board as its background, the boundary between a background board and an original for the input image data of an image of a part of the background board and an edge of the original input in a same color is detected, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

33. The device according to claim 32, wherein
each of said units functions in four different directions parallel or orthogonal to each other on the image data in which an original is surrounded by the background board.

34. The device according to claim 29, further comprising a printing area exclusion unit excluding a printing area of the image data from targets from which a boundary between areas having different features is detected.

35. The device according to claim 29, wherein
said feature information comprises a high frequency element, a low frequency element, a direct current element, and a frequency distribution.

36. The device according to claim 32, further comprising an image reading unit optically reading an original and generating the image data of the original.

37. The device according to claim 33, further comprising a cant correction unit for correcting cant of an area contained in a rectangle when the determined boundary forms the rectangle.

38. The device according to claim 32, further comprising an image exclusion unit leaving one area adjacent to the boundary or an original portion of the image data, and removing the other area or a background board of the image data based on the determined boundary.

39. The device according to claim 32, further comprising:
an image coloring unit coloring one area adjacent to the boundary or a background board portion of the image data in black based on the determined boundary; and a character recognition unit recognizing a character contained in an area adjacent to the boundary other than the area colored in black.

40. A copying machine comprising:

a printing area exclusion unit excluding a printing area of image information;

a feature emphasis unit extracting feature information depending on all image information in a unit area for each unit area of an image information; and a boundary determination unit obtaining a difference in the feature information between adjacent unit areas for an arbitrary unit area, and determining as a boundary the unit area other than the printing area whose difference is at or higher than a predetermined level, wherein the copying machine provides a background board on a back of an original, reads image information about the original, and outputs a copy of the original with a size of the original designated based on detection of a boundary between the background board and the original, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

41. A copying machine comprising:

a printing area exclusion unit excluding a printing area of image information;

a feature emphasis unit extracting image frequency information for each unit area of an image information; and a boundary determination unit determining representative feature information according to the extracted image frequency information, obtaining a difference in the representative feature information between adjacent unit areas for an arbitrary unit area, and determining as a boundary the unit area other than the printing area whose difference is at or higher than a predetermined level, wherein the copying machine provides a background board on a back of an original, reads image information about the original, and outputs a copy of the original with a size of the original designated based on detection of a boundary between the background board and the original, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

42. A copying machine comprising:

a printing area exclusion unit excluding a printing area of image information;

a feature emphasis unit extracting first image frequency information of predetermined types for each first unit area of an image information;

a boundary provisional determination unit defining a value obtained by adding a predetermined weight to each type of the extracted first image frequency information as representative feature information, and provisionally determining as a boundary a first unit area whose variance from the representative feature information of an adjacent first unit area is at or higher than a predetermined level in an arbitrary first unit area; and a boundary determination unit extracting second image frequency information for each second unit area smaller than the first unit area in the first unit area provisionally determined as the boundary and a vicinal area of the first unit area, and determining as the boundary a second unit area whose value based on the variance from the second image frequency information of the adjacent second unit area is at or higher than a predetermined level in an arbitrary second unit area, wherein the copying machine provides a background board on a back of an original, reads image information about the original, and outputs a copy of the original with a size of the original designated based on detection of a boundary between the background board and the original, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

43. A copying machine comprising:

a printing area exclusion unit excluding a printing area of image information;

a feature emphasis unit performing a Fourier-transform on each first unit area of an input image information, and extracting first image frequency information of predetermined types obtained by the Fourier-transform processing;

a boundary provisional determination unit defining a value obtained by adding a predetermined weight to each type of the extracted first image frequency information as representative feature information for each of the first unit areas, and provisionally determining as a boundary a corresponding area on an approximate line obtained by performing line approximation on a first unit area other than the printing area whose variance from the representative feature information about an adjacent first unit area is at or higher than a predetermined level in an arbitrary first unit area; and a boundary determination unit performing a Fourier-transform on each second unit area smaller than the first unit area in the first unit area provisionally determined as the boundary and a vicinal area of the first unit area, extracting second image frequency information of predetermined types obtained by the Fourier-transform, defining as representative feature information a value obtained by adding a predetermined weight to each type of the extracted second image frequency information for each second unit area, performing a Wavelet transform on the representative feature information, performing line approximation on a second unit area whose value for each second unit area obtained by the Wavelet transform is at or higher than a predetermined level, and determining a position on the approximate line obtained by the line approximation as the boundary, wherein the copying machine provides a background board on a back of an original, reads image information about the original, and outputs a copy of the original with a size of the original designated based on detection of a boundary between the background board and the original, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

44. The copying machine according to claim 43, wherein each of said units functions in four different directions parallel or orthogonal to each other on the image information in which an original is surrounded by the background board.

45. The copying machine according to claim 40, wherein a printing area of the image information is excluded based on a gray scale value.

46. An image processing device comprising:

feature emphasis means for extracting feature information depending on all pixels in a unit area for each unit area of an image data; and boundary determination means for obtaining a difference in the feature information between adjacent unit areas for an arbitrary unit area, and determining as a boundary the unit area whose difference is at or higher than a predetermined level, wherein the input image data of an original whose front image is input with a background board as its background, the boundary between areas having different features among arbitrary adjacent areas in the image data is detected, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

47. A copying machine comprising:

printing area exclusion means for excluding a printing area of image information;

feature emphasis means for extracting feature information depending on all image information in a unit area for each unit area of an image information; and boundary determination means for obtaining a difference in the feature information between adjacent unit areas for an arbitrary unit area, and determining as a boundary the unit area other than the printing area whose difference is at or higher than a predetermined level, wherein the copying machine provides a background board on a back of an original, reads image information about the original, and outputs a copy of the original with a size of the original designated based on detection of a boundary between the background board and the original, a target is roughly predicted with a printing area first excluded, and a variance in feature information from the adjacent area corresponding to the printing area can be ignored, then the boundary between the background board and the original is detected, and if unit area of an image is set widely, the boundary position between the background board on the image and the original is provisionally determined based on the feature amount obtained in a two-dimensional fast-Fourier-transform, a one-dimensional fast-Fourier-transform is performed in a unit of an area smaller than the unit area of the image, and then a Wavelet transform is performed for detecting the position of the boundary.

* * * * *